United States Patent
Bogolea et al.

(10) Patent No.: US 10,625,426 B2
(45) Date of Patent: Apr. 21, 2020

(54) METHOD FOR AUTOMATICALLY GENERATING PLANOGRAMS OF SHELVING STRUCTURES WITHIN A STORE

(71) Applicant: Simbe Robotics, Inc., San Francisco, CA (US)

(72) Inventors: Bradley Bogolea, San Francisco, CA (US); Mirza Akbar Shah, San Francisco, CA (US); Jariullah Safi, San Francisco, CA (US); Luke Fraser, San Francisco, CA (US); Lorin Vandegrift, San Francisco, CA (US); Jeffrey Gee, San Francisco, CA (US)

(73) Assignee: Simbe Robotics, Inc., San Francisco, CA (US)

( * ) Notice: Subject to any disclaimer, the term of this patent is extended or adjusted under 35 U.S.C. 154(b) by 276 days.

(21) Appl. No.: 15/600,591

(22) Filed: May 19, 2017

(65) Prior Publication Data

US 2018/0005035 A1 Jan. 4, 2018

Related U.S. Application Data

(60) Provisional application No. 62/339,047, filed on May 19, 2016, provisional application No. 62/339,039, (Continued)

(51) Int. Cl.
*G06K 9/00* (2006.01)
*B25J 11/00* (2006.01)
(Continued)

(52) U.S. Cl.
CPC .......... *B25J 11/008* (2013.01); *B25J 9/1664* (2013.01); *B25J 9/1697* (2013.01); *B25J 13/089* (2013.01);
(Continued)

(58) Field of Classification Search
CPC .............. G05D 1/0246; G05D 1/0274; G05D 2201/0207; G05D 1/0282; G06K 9/033;
(Continued)

(56) References Cited

U.S. PATENT DOCUMENTS 5,226,782 A * 7/1993 Rigling ................ B65G 1/0407
198/347.3
5,583,950 A * 12/1996 Prokoski ................ G06F 17/153
382/212

(Continued)

*Primary Examiner* — Andrew Joseph Rudy
(74) *Attorney, Agent, or Firm* — Run8 Patent Group, LLC; Peter Miller

(57) ABSTRACT

One variation of a method for automatically generating a planogram for a store includes: dispatching a robotic system to autonomously navigate within the store during a mapping routine; accessing a floor map of the floor space generated by the robotic system from map data collected during the mapping routine; identifying a shelving structure within the map of the floor space; defining a first set of waypoints along an aisle facing the shelving structure; dispatching the robotic system to navigate to and to capture optical data at the set of waypoints during an imaging routine; receiving a set of images generated from optical data recorded by the robotic system during the imaging routine; identifying products and positions of products in the set of images; and generating a planogram of the shelving segment based on products and positions of products identified in the set of images.

20 Claims, 4 Drawing Sheets

US 10,625,426 B2

Page 2

Related U.S. Application Data filed on May 19, 2016, provisional application No. 62/339,045, filed on May 19, 2016.

(51) Int. Cl.
*G06Q 20/00* (2012.01)
*B25J 9/16* (2006.01)
*B25J 13/08* (2006.01)
*B25J 19/02* (2006.01)
*G06Q 10/08* (2012.01)
*G06K 9/20* (2006.01)
*G06K 9/52* (2006.01)
*G06Q 30/02* (2012.01)
*G06T 5/00* (2006.01)
*G06T 7/00* (2017.01)

(52) U.S. Cl.
CPC ........ *B25J 19/023* (2013.01); *G06K 9/00671* (2013.01); *G06K 9/2063* (2013.01); *G06Q 10/087* (2013.01); *G06Q 20/00* (2013.01); *B64C 2201/127* (2013.01); *B64C 2201/146* (2013.01); *G06K 9/52* (2013.01); *G06Q 30/0201* (2013.01); *G06T 5/006* (2013.01); *G06T 7/0008* (2013.01)

(58) Field of Classification Search
CPC ............... G06K 9/6201; G06K 9/6217; G06K 9/00771; G06Q 10/087; H04N 1/00; H04N 5/232; H04N 5/23238; H04N 5/3572; H04N 5/23229; B25J 19/023
USPC .................................. 700/216, 217; 705/28
See application file for complete search history.

(56) References Cited

U.S. PATENT DOCUMENTS

| | | | | |
|---|---|---|---|---|
| 7,475,205 B2* | | 1/2009 | McIntosh | G11B 27/002 710/13 |
| 7,542,883 B2* | | 6/2009 | Kumazawa | G06Q 90/00 703/2 |
| 7,693,757 B2* | | 4/2010 | Zimmerman | G06Q 10/00 235/462.11 |
| 8,098,888 B1* | | 1/2012 | Mummareddy | G06K 9/00778 382/103 |
| 8,326,451 B2* | | 12/2012 | Schantz | G01S 13/751 700/215 |
| 9,273,973 B2* | | 3/2016 | Sakamoto | G05D 1/0214 |
| 9,663,309 B2* | | 5/2017 | Priebe | B65G 57/26 |
| 10,162,043 B2* | | 12/2018 | Simon | G01S 1/042 |
| 2002/0165638 A1 | | 11/2002 | Bancroft et al. | |
| 2003/0216834 A1* | | 11/2003 | Allard | B25J 9/1689 700/245 |
| 2004/0162765 A1* | | 8/2004 | Reber | G06Q 10/087 705/26.9 |
| 2005/0261975 A1 | | 11/2005 | Carver | |
| 2007/0061041 A1* | | 3/2007 | Zweig | G05D 1/0261 700/245 |
| 2007/0288296 A1 | | 12/2007 | Lewis | |
| 2008/0024306 A1* | | 1/2008 | Bomber | G06K 7/10881 340/572.7 |
| 2008/0077511 A1 | | 3/2008 | Zimmerman | |
| 2009/0059270 A1 | | 3/2009 | Opalach et al. | |
| 2009/0325598 A1* | | 12/2009 | Guigne | G01S 5/021 455/456.1 |
| 2010/0070369 A1* | | 3/2010 | Fenton | G06Q 20/3224 705/14.58 |
| 2011/0011936 A1 | | 1/2011 | Morandi et al. | |
| 2011/0288684 A1* | | 11/2011 | Farlow | B25J 11/009 700/264 |
| 2014/0247116 A1 | | 9/2014 | Davidson | |
| 2014/0279294 A1 | | 9/2014 | Field-Darragh et al. | |
| 2014/0361077 A1 | | 12/2014 | Davidson | |
| 2015/0073586 A1 | | 3/2015 | Weiss | |
| 2015/0073588 A1 | | 3/2015 | Priebe et al. | |
| 2015/0088937 A1* | | 3/2015 | Lons | G06Q 10/00 707/803 |
| 2015/0161715 A1* | | 6/2015 | Rose | G06Q 30/0639 705/26.8 |
| 2015/0363758 A1 | | 12/2015 | Wu et al. | |

* cited by examiner

METHOD FOR AUTOMATICALLY GENERATING PLANOGRAMS OF SHELVING STRUCTURES WITHIN A STORE

CROSS-REFERENCE TO RELATED APPLICATIONS

This Application claims the benefit of U.S. Provisional Application No. 62/339,047, filed on 19 May 2016, U.S. Provisional Application No. 62/339,039, filed on 19 May 2016, and U.S. Provisional Application No. 62/339,045, filed on 19 May 2016, all of which are incorporated in their entireties by this reference.

The Application is related to U.S. patent application Ser. No. 15/347,689, filed on 9 Nov. 2016, and to U.S. patent application Ser. No. 15/600,527, filed on 19 May 2017, which are incorporated in their entireties by this reference.

TECHNICAL FIELD

This invention relates generally to the field of stock keeping and more specifically to a new and useful method for automatically generating a planogram that assigns products to shelving structures within a store in the field of stock keeping.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
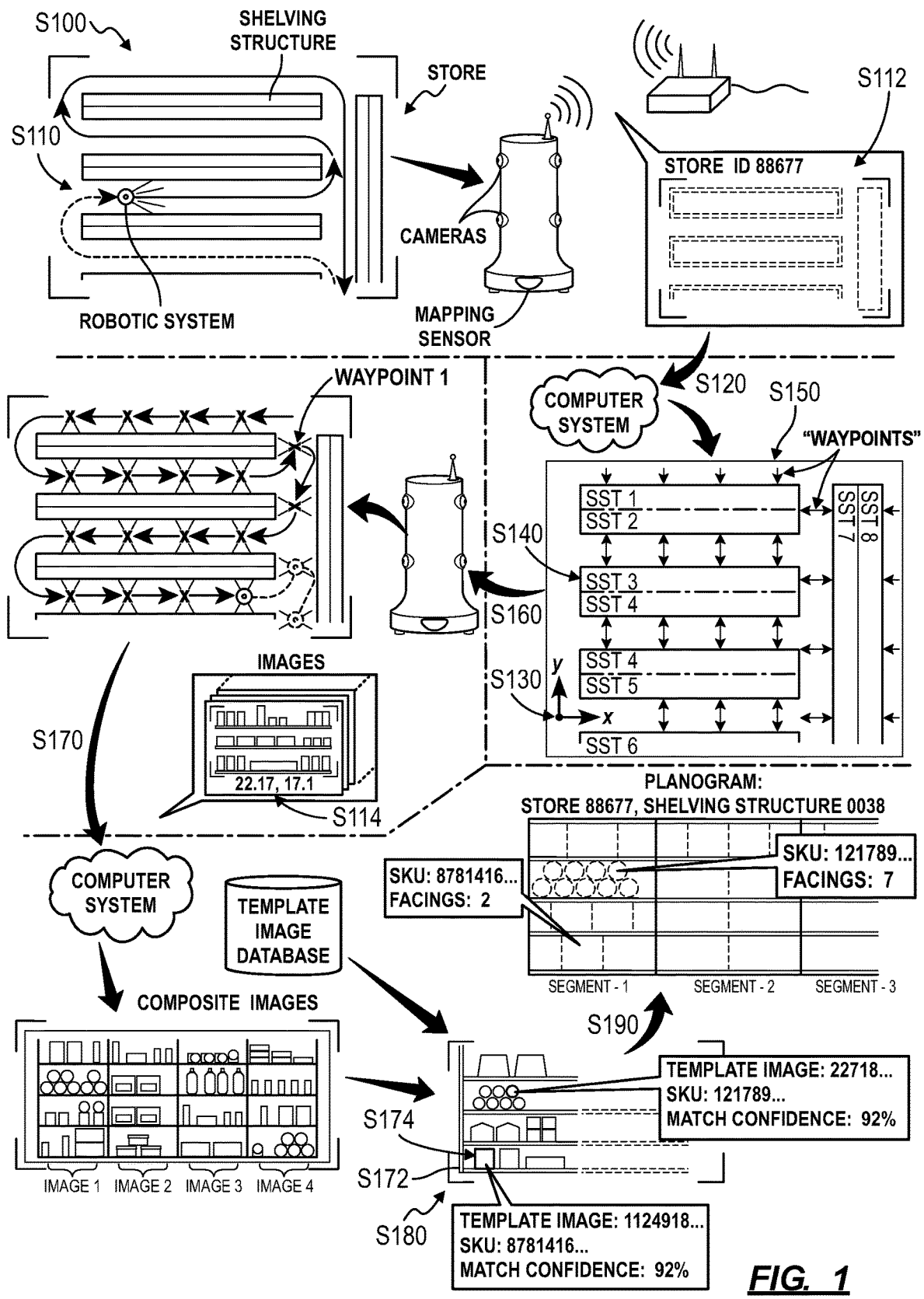
FIG. 1 is a flowchart representation of a method.

As shown in FIG. 1, a method for automatically generating a planogram assigning products to shelving structures within a store, the method includes: dispatching a robotic system to autonomously collect map data of a floor space within the store during a first mapping routine in Block S110; initializing the planogram of the store, the planogram representing locations of a set of shelving structures within the store based on map data recorded by the robotic system in Block S190; dispatching the robotic system to record optical data at a first waypoint proximal a first shelving structure, in the set of shelving structures, during a first imaging routine in Block S160; accessing a first image including optical data recorded by the robotic system while occupying the first waypoint in Block S170; detecting a first shelf at a first vertical position in the first image in Block S172; detecting a first object in a first lateral position over the first shelf in the first image in Block S174; identifying the first object as a unit of a first product based on features extracted from a first region of the first image representing the first object in Block S180; and projecting the first vertical position of the first shelf and the first lateral position of the first object onto a representation of the first shelving structure in the planogram to define a first slot and writing an assignment for the first product to the first slot in response to identifying the first object as the unit of a first product in Block S190.

One variation of the method includes: dispatching a robotic system to autonomously navigate through a floor space within the store during a mapping routine in Block S110; accessing a floor map of the floor space generated by the robotic system from map data collected during the mapping routine in Block S120; defining a coordinate system for the store in the floor map in Block S130; identifying a shelving structure within the map of the floor space in Block 140; based on the coordinate system, defining a first set of waypoints along an aisle facing the shelving structure in Block S150; dispatching the robotic system to navigate to and to capture visual at the set of waypoints during an imaging routine in Block S160; receiving a set of images generated from optical data recorded by the robotic system during the imaging routine in Block S170; identifying products and positions of products in the set of images in Block S180; and generating a planogram of the shelving segment based on products and positions of products identified in the set of images in Block S190.

Figure 3:
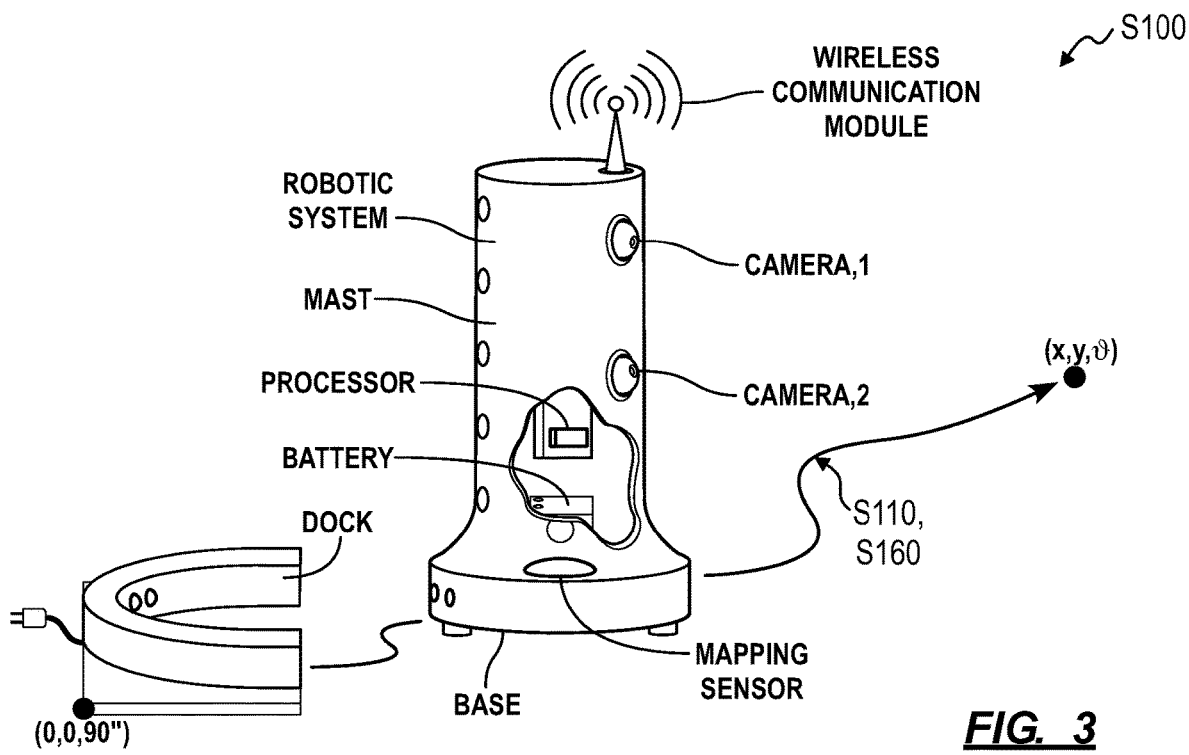
FIG. 3 is a schematic representation of one variation of the method.

As shown in FIGS. 1 and 3, another variation of the method includes: at a robotic system, generating a map of a floor space within a store while autonomously navigating through the store in Block S112; at the robotic system, capturing a sequence of images of shelves within the store while autonomously navigating through the store in Block S114; identifying a shelving structure within the map of the floor space in Block 140; identifying products and positions of products in a set of images, in the sequence of images, captured by the robotic system proximal the shelving structure in Block S180; and generating a planogram of the shelving segment based on products and positions of products identified in the set of images in Block S190.

2. Applications

Generally, Blocks of the method can be executed by a computer system and/or by a robotic system (together the "system") to automatically generate a planogram representing placements of products on shelves within a store, such as when a robotic system is first provisioned to a store for which a floor plan, architectural layout, and product assignments throughout all or part of the store is not available. In particular, the computer system can: dispatch a robotic system to autonomously navigate through a store and to generate a 2D or 3D map of the store during a mapping routine; process this map of the store to define various waypoints adjacent shelves—loaded with product— throughout the store; upload these waypoints to the robotic system and dispatch the robotic system to navigate and capture images at each of these waypoints during an imaging routine; identify products shown in these images captured by the robotic system; and then generate a planogram (e.g., containing an elevation map of each side of each shelving structure) for the store, wherein each planogram identifies products and depicts placement of these products in corresponding slots on shelves, in shelving segments, and within shelving structures throughout the store. The method can therefore be executed by the system to automatically generate a planogram for a store by collecting and processing map data and images captured by a robotic system provisioned to the store. Once the computer system generates an initial instance of the planogram for the store, a manager or associate of the store can confirm or adjust locations and product assignments of slots defined by the planogram; and the computer system can compare this planogram to products and locations of these products identified in images recorded by the robotic system during later imaging routines to determine whether later stocking states of the store fulfill requirements specified by the planogram.

In one implementation, the computer system executes the method following confirmation of a manual (re)stocking procedure at a store (or warehouse, retail facility, etc.) in which employees of the store manually stock products on shelves and properly orient these products on these shelves in the store. Once proper stocking of the store is completed and confirmed (e.g., by a manager of the store through an operator portal executing on a desktop computer or tablet communicating with the computer system over the Internet), the computer system can execute Blocks of the method to: trigger the robotic system to execute a mapping routine to capture map data and to execute an imaging routine to capture images throughout the store; process these map data and images; and automatically generate a planogram representing placement of products within the store during this (approximately) "ideal" stocked period. Upon generation of this planogram in Block S190, the system can interface with a manager or other employee of the store through an operator portal to move, modify, add, and/or remove product assignments, product facing assignments, and discrete slots stored in this planogram, such as to correct errors in real placements of products within the store during the imaging routine, to correct products misidentified in images recorded during the imaging routine, or to update the store's planogram for a next season or upcoming holiday. For example, a manager of the store can manually modify this planogram and distribute this modified planogram to employees of the store to guide changes to the types and/or placements of products within the store.

Later the computer system can compare this planogram to images of shelving structures captured by the robotic system during subsequent imaging routines at the store in order to detect deviations from this planogram, such as products missing from shelves, products improperly oriented on shelves, products misplaced on shelves, and/or products mislabeled on shelves, etc. within the store, as described in U.S. patent application Ser. No. 15/600,527. For example, following generation of a planogram in Block S190, the system can generate a refined set of waypoints for the store based on real mapping data collected by the robotic system while navigating throughout the store and based on stocking data stored in the planogram. In this example, each night beginning at 1 AM (e.g., when the store is closed or minimally trafficked), the robotic system can sequentially navigate to locations and orientations in the store defined by these refined waypoints, capture one or more images at each of these waypoints, and return these images to the computer system. The computer system can then automatically transform these images into a graph, table, or map of positions of products on shelves throughout the store, including deviations from the planogram, and the system can present this graph, map, or table, to employees of the store upon their arrival at the store the following morning before the store opens.

The computer system and the robotic system can therefore cooperate to execute Blocks of the method to automatically generate a current planogram for a store (or warehouse, etc.): that does not currently have, use, or maintain a planogram; has only an outdated planogram; or has shifted locations of shelving structures, shelving segments, shelves, etc. throughout the store. For example, the system can automatically dispatch a robotic system within a store, collect map data and images from the robotic system, and process these images into a planogram representing many (e.g., dozens, hundreds of) shelving structures, each stocked with one or more facings for each of hundreds, thousands, or tens of thousands of unique products. By involving a human to provide guidance or supervision for writing product assignments to a limited number of slots in the new planogram associated with relatively low confidence scores for product identification in corresponding regions of images recorded by the robotic system during the imaging routine, the computer system can generate a highly-accurate planogram of the store while limiting involvement of a manager, associate, or other employee of the store to produce this planogram.

3. Robotic System

A robotic system executes Blocks S110 and S112 of the method S100 to navigate to a waypoint and to capture images of shelves in the store. Generally, the robotic system can define a network-enabled mobile robot that can autonomously traverse a store, capture images of shelves within the store, and upload those images to a remote computer system for analysis.

In one implementation, the robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems); a processor that transforms data collected by the mapping sensors into two- or three-dimensional maps of a space around the robotic system; a mast extending vertically from the base; a set of cameras arranged on the mast; a geospatial position sensor (e.g., a GPS sensor); and a wireless communication module that downloads waypoints and a master map of a store from a remote computer system (e.g., a remote server) and that uploads photographic images captured by the camera and maps generated by the processor to the remote computer system, as shown in FIG. 3. In this implementation, the robotic system can include cameras mounted statically to the mast, such as two vertically offset cameras on a left side of the mast and two vertically offset cameras on the right side of mast, as shown in FIG. 3. The robotic system can additionally or alternatively include articulable cameras, such as: one camera on the left side of the mast and supported by a first vertical scanning actuator; and one camera on the right side of the mast and supported by a second vertical scanning actuator. The robotic system can also include a zoom lens, a wide-angle lens, or any other type of lens on each camera. However, the robotic system can define any other form and can include any other subsystems or elements supporting autonomous navigating and image capture throughout a store environment.

The system can also include multiple robotic systems placed in a single store and configured to cooperate to image shelves within the store. For example, two robotic systems can be placed in a large single-floor retail and can cooperate to collect images of all shelves in the store within a threshold period of time (e.g., within one hour). In another example, one robotic system can be placed on each floor of a multi-floor store, and each robotic system can each collect images of shelves on its corresponding floor. The remote computer system can then aggregate images captured by multiple robotic systems placed in one store to generate a graph, map, table, and/or task list of properly- and improperly-stocked slots within the store.

4. Hierarchy and Terms

A "product facing" is referred to herein as a side of a product (e.g., of a particular SKU or other product identifier) designated for a slot. A "planogram" is referred to herein as a graphical representation of multiple product facings across each of multiple shelving structures within a store (e.g., across an entire store). Product identification, placement, and orientation data recorded visually in a planogram can be also be recorded in a corresponding textual product placement spreadsheet, slot index, or other store database (hereinafter a "product placement database").

A "slot" is referred to herein as a section of a shelf designated for occupation by one product facing, including a row of one or more units of a product. A "shelf" is reference herein as one lateral surface (e.g., one four-foot-wide horizontal surface) spanning one or more slots. A "shelving segment" is referred to herein as one column of a shelving structure, including one or more shelves. A "shelving structure" is referred to herein as a row of one or more shelving segments. An "aisle" is referred to herein as a thoroughfare between two opposing shelving structures. A "store" is referred to herein as a (static or mobile) facility containing one or more shelving structures and one or more aisles.

A "product" is referred to herein as a type of packaged good associated with a particular product identifier (e.g., a SKU). A "unit" or "product unit" is referred to herein as an instance of a product, such as one packaged article in a series of packaged articles associated with one SKU value.

The method S100 is described herein as executed by a remote computer system (e.g., a remote server, hereinafter a "computer system"). However, Blocks of the method S100 can be executed by one or more robotic systems placed in a retail space (or store, warehouse, etc.), by a local computer system, or by any other computer system—hereinafter a "system."

Furthermore, Blocks of the method S100 are described below as executed by the system to identify products stocked on open shelves on shelving structures within a store. However, the system can implement similar methods and techniques to identify products stocked in cubbies, in a refrigeration unit, on a wall rack, in a freestanding floor rack, on a table, or on or in any other product organizer in a retail space.

5. Robotic System Provisioning

Block S110 of the method recites dispatching a robotic system to autonomously collect map data of a floor space within the store during a first mapping routine. Generally, in Block S110, the system triggers a robotic system to autonomously navigate through the store and to generate a 2D map of the floor space within the store (and/or to generate a 3D map of the interior volume of the store).

In one implementation, once the robotic system is powered on in a store following initial placement in the store, the system can serve a prompt to the robotic system in Block S110, such as via a computer network (e.g., the Internet), to initiate a mapping routine. For example, the robotic system can immediately initiate a mapping routine upon receipt of the prompt from the system, or the robotic system can queue the mapping routine for a subsequent scheduled scan time, such as at 2 AM when the store is closed or (substantially) unoccupied. Alternatively, the robotic system can automatically initiate a mapping routine when first powered on within the store or in response to a manual input from a user, such as manual selection of a "Start" button on the robotic system or within an operator portal executing on a mobile computing device and affiliated with the store or the robotic system.

In another implementation, the system dispatches the robotic system to execute a first mapping routine within the store following initial delivery of the robotic system to the store and in response to receipt of confirmation of a preferred stocking condition currently present in the store. For example, in preparation for autonomous generation of a new planogram for the store, associates of the store can manually stock each slot, shelf, shelving segment, shelving structure, cubby, refrigeration unit, wall rack, freestanding floor rack, and/or table, etc. throughout the store with preferred numbers and orientations of various products; once the robotic system is provisioned to the store and connected to a local wireless network within the store, an human operator (e.g., a manager of the store or entity affiliated with the robotic system) can access an operator portal through a computing device (e.g., a desktop computer or smartphone, etc.), confirm the current state of the store fulfills a (approximately) desired stocking condition, and then select a function to generate a new planogram of the store according to the current stocking condition. Upon receipt of confirmation of the desired stocking condition and the new planogram function, the system can initiate execution of the method by first dispatching the robotic system to collect map data of the store and/or to generate a map of the store in Block S110. However, the system can implement any other method or technique in Block S110 to trigger the robotic system to execute a mapping routine.

The robotic system can then autonomously navigate through the store while recording distance data through its integrated mapping sensors and generating a 2D (or 3D) map of the physical interior space of the store. For example, the robotic system can implement simultaneous localization and mapping (or "SLAM") techniques to construct and update a map of an unknown environment within the store while also tracking its location within the map based on LIDAR-based distance scans collected throughout the mapping routine. However, the robotic system can implement any other methods or techniques to generate a 2D map of the floor space within the store (or to generate a 3D map of the interior of the store).

Alternatively, the robotic system can collect raw map data during a mapping routine and upload these data to the system (e.g., a remote server, such as via the Internet) in real-time during the mapping routine or upon conclusion of the mapping routine. The system can then implement similar methods and techniques to reconstruct these raw map data into a 2D floor plan or 3D map (e.g., a point cloud) of the store (hereinafter a "floor map") remotely from the robotic system, as described below.

5.1 Multiple Robotic Systems

In one variation, the system includes multiple robotic systems that are provisioned to a single store, cooperate to collect map data during a mapping routine and cooperate to collect images during an imaging routine, such as by autonomously executing assigned subsets of waypoints defined for the store. For example, two robotic systems can be placed in a large single-floor retail store and can cooperate to collect map data and images of all shelves in the store within mapping and imaging routines of limited duration (e.g., less than one hour). In another example, one robotic system can be placed on each floor of a multi-floor store, and each robotic system placed in the store can collect map data and images of shelves on its assigned floor. Following mapping routines by these robotic systems within the store, the system can collect map and image data from these robotic systems in Block S120 and then implement methods and techniques described herein to generate a multi-level planogram layout and a planogram for each level of the store.

6. Real Floor Map

Block S120 of the method recites receiving a map of the floor space from the robotic system. Generally, in Block S120, the system functions to collect a 2D map of the floor space of the store (or a 3D map or point cloud of the interior of the store) from the robotic system following completion of the mapping routine described above. For example, upon completion of the mapping routine, the robotic system can upload the map to the system via a local Internet-connected wireless router or via a cellular network. However, the system can collect a map of real locations of obstacles and structures within the store in any other way and in any other format.

Block S140 of the method recites identifying a shelving structure within the map of the floor space. Generally, in Block 140, the system functions to identify the existence and position of a real shelving structure within the store based on data contained in the floor map.

6.1 2D Floor Map

In one implementation, the robotic system generates a 2D point cloud of the store at one horizontal plane offset above the floor of the store (e.g., two inches above the floor of the store) and uploads this point cloud to the system in Block S120. In this implementation, the system can then implement line extraction techniques to transform the 2D point cloud into a vectorized 2D line map representing real (e.g., dimensionally-accurate) positions and external dimensions of structures arranged on the floor throughout the store. The system can then implement pattern matching, structure recognition, template matching, and/or other computer vision techniques to identify large, discrete, (approximately) rectilinear regions in the vectorized 2D line map as shelving structures (and/or other storage elements) in the store and then label the vectorized line map (hereinafter a "floor map") accordingly in Block S140.

In one example, the system can: label a discrete rectangular structure exhibiting a maximum horizontal dimension greater than one meter and exhibiting an aspect ratio greater than 2:1 as a shelving structure; label a discrete rectangular structure exhibiting a maximum horizontal dimension greater than one meter and exhibiting an aspect ratio less than 2:1 as an open table; label a discrete rectangular structure exhibiting a maximum horizontal dimension less than one meter and exhibiting an aspect ratio less than 2:1 as a freestanding popup unit; label a discrete amorphous structure exhibiting a maximum horizontal dimension less than one meter and exhibiting an aspect ratio less than 2:1 as a freestanding floor unit; etc. In another example, the system can: access a database of standard plan dimensions (e.g., length and width) and geometries (e.g., rectangular) of shelving structures, checkout lanes, refrigeration units, etc. common to retail settings; extract dimensions and geometries of structures on the floor of the space from the 2D line map; and compare these structure dimensions and geometries to standard plan and geometry definitions stored in the database to identify and label select structures represented in the 2D line map as shelving structures.

In another example, the system can implement edge detection techniques to scan a single horizontal plane in the floor map for ~90° corners, identify a closed region in the floor map bounded by a set of four ~90° corners as a shelving structure, and identify an open area between two such shelving structures as an aisle; the system can then populate the floor map with labels for shelving structures and aisles accordingly. However, the system can implement template matching, edge detection, pattern matching, pattern recognition, optical character recognition, color recognition, content-based image retrieval, pose estimation, code reading, shape recognition, and/or any other suitable method or processing technique to identify features in the floor map and to correlate these features with one or more shelving structures within the store.

6.2 3D Floor Map

Alternatively, the robotic system can generate a 3D point cloud of the store during a mapping routine. Upon receipt of the 3D point cloud from the robotic system in Block S120, the system can select an horizontal slice of the 3D point cloud offset above (e.g., approximately two inches above) a floor surface represented in the 3D point cloud and then implement similar techniques to transform this plane of points into a vectorized 2D line map representing real positions and external dimensions of structures occupying the floor of the store. The system can then implement methods and techniques described above to identify all or a subset of these discrete structures as shelving structures and/or other storage elements in the store. For example, the system can: transform a 3D point cloud received from the robotic system into a vectorized 3D line map representing real positions of shelving structures (and other structures) in the store; identify discrete volumes bounded by lines in the vectorized 3D line; compare dimensions and geometries of these discrete volumes to a database defining dimensions and geometries of standard shelving structures, checkout aisles, refrigeration units, etc. in retail settings; and then label these discrete volumes as shelving structures, checkout aisles, refrigeration units, etc. accordingly. However, the system can implement any other method or technique to automatically identify and label discrete structures represented in a floor map of the store (e.g., a 2D or 3D point cloud, vectorized line map, etc.) as shelving structures or other storage elements within the store without a pre-generated floor layout or other pre-generated data.

6.3 Architectural Plan

In another implementation, the system can: access an architectural plan of the store; align the architectural plan to the 2D line map (or 2D or 3D point cloud, etc.), as described in U.S. Provisional Application No. 62/339,045; project shelving structure labels, addresses, and/or other identifiers from the architectural plan onto the 2D line map in order to label discrete structures in the 2D line map as shelving structures (and/or other storage elements, etc.).

6.4 Supervised Shelving Structure Detection

In the foregoing implementations, once the system identifies shelving structures represented in a floor map of the store, the system can prompt a human operator (e.g., a robotic system operator, a manager of the store) to confirm shelving structure labels autonomously applied to the floor map. For example, the system can serve a visual form of the floor map to the operator through the operator portal executing on the operator's mobile computing device or desktop computer and render shelving structure labels over the visual form of the floor map; the operator can then manually review and adjust these shelving structure labels, thereby providing supervision to the system in identifying shelving structures throughout the store, such as prior to generation of waypoints for an upcoming imaging routine. Alternatively, the system can transform map data received from the robotic system into a vectorized floor map (e.g., a vectorized 2D or 3D line map) of the store, identify discrete structures arranged on the floor of the store within the floor map, and serve this floor map with discrete structures highlighted within the floor map to the operator portal; the operator can then manually confirm that structures highlighted in the floor map represent shelving structures through the operator portal. However, the system can interface with an human operator through the operator portal in any other way to collect information confirming identification of shelving structures or identifying shelving structures directly in the floor map of the store.

However, the system can implement any other method or technique to transform raw map data (or a vectorized 2D or 3D line map) received from the robotic system into a labeled floor map identifying known (or predicted) locations of shelving structures (and/or other storage elements), such as relative to a coordinate system described below.

7. Coordinate System

Block S130 of the method recites defining a coordinate system in the floor map. Generally, in Block S130, the system locates a coordinate system in preparation for calculation of lateral distances, longitudinal distances, and orientations (e.g., yaw angle) of waypoints relative to a coordinate system in Block S160.

In one example, the system identifies a location of the dock—placed in the store—in the floor map based on map data received from the robotic system in Block S120 and then defines an origin of the coordinate system at the location of the dock represented in the floor map. In this example, the system then aligns an x-axis of the coordinate system to a longest linear wall identified in the floor map (e.g., as described below). However, the system can locate and position a coordinate system in any other way or according to any other parameters.

8. Waypoint Generation

Block S150 of the method recites, based on the coordinate system, defining a set of waypoints along an aisle facing a shelving structure in Block S150. Generally, in Block S150, the system generates a list of waypoint defining positions within the store—relative to the coordinate system—at which the robotic system is to navigate and capture digital photographic images based on positions of labeled shelving structures within the floor map.

In Block S120 described above, the system can identify a first shelving structure represented in the floor map and label the first shelving structure as a first shelving structure within the store; in Block S150, the system can then define a first set of waypoints—relative to the coordinate system—along this first shelving structure, wherein each waypoint in the first set of waypoints specifies an orientation that orients cameras integrated into the robotic system toward the first shelving structure.

In one implementation, the system generates a number of waypoints along an aisle facing the first shelving structure sufficient to achieve a target overlap (e.g., 30% overlap) of adjacent images captured at adjacent waypoints along the first shelving structure, thereby enabling the system to stitch these discrete images into a single panoramic image spanning the full length of the first shelving structure, as described below and shown in FIG. 1. In one example, the system defines an imaging line vector extending along the length of the first shelving structure in the floor map of the store. The system can then set a lateral offset distance between the face of the first shelving structure and the imaging line vector given a fixed zoom level, low zoom level, or limited zoom range of cameras in the robotic system to achieve sufficient vertical overlap (e.g., at least 30% vertical image overlap) of vertically-adjacent images—captured by the robotic system occupying a waypoint on the imaging line vector offset from the face of the first shelving structure by the lateral waypoint offset distance—at the imaging plane of the first shelving structure given the width of the aisle and the height of the shelving structure (e.g., a standard height of seven feet or an height determined from 3D map data collected by the robotic system during the mapping routine). The system can also adjust zoom levels of cameras at or along the imaging line vector to achieve at least a target resolution of images—captured by the robotic system along the imaging line vector—to meet resolution requirements for image processing in subsequent Blocks of the method. Subsequently, the system can calculate a longitudinal waypoint offset distance along the imaging line vector that achieves sufficient horizontal overlap (e.g., at least 30% horizontal image overlap) of horizontally-adjacent images—captured by the robotic system at two waypoints along the imaging line vector separated by the longitudinal waypoint offset distance—at the imaging plane of the first shelving structure given the width of the aisle and the zoom level. The system can thus calculate locations (e.g., (x,y) coordinates within the coordinate system) of waypoints along the imaging line vector and offset by the longitudinal waypoint offset distance accordingly.

The robotic system can also assign an orientation (e.g., a yaw angle) to each waypoint along the first shelving structure such that the fields of view of cameras in the robotic system are substantially normal to the face of the first shelving structure. Thus, when executing this set of waypoints in Block S160, the robotic system can capture images—though cameras arranged on one side of the robotic system facing the first shelving structure—at one waypoint before navigating to a next waypoint along the first shelving structure; the system can collect these images in Block S170, process these images in Block S180 into identities and locations of products on the first shelving structure, and generate a planogram of the first shelving structure in Block S190, as described below.

Alternatively, for the robotic system that includes cameras on both lateral sides, the system can: identify a first aisle, a first shelving structure, and a second shelving structure facing the first shelving structure in the floor map of the store; generate an imaging line vector centered along the first aisle; assign zoom levels of cameras in the shelving structure for waypoints along this imaging line vector based on the width of the aisle and resolution requirements of these images for processing in Block S180; and then implement methods and techniques described above to define waypoints along the imaging line vector. Once dispatched to execute these waypoints in Block S160, the robotic system can record images of the first and second shelving structures simultaneously through cameras arranged on both lateral sides of the robotic system.

The system can implement the foregoing methods and techniques to generate waypoints for (substantially) all or select structures identified in the floor map. For example, the system can define waypoints along all shelving structures (and other storage elements) identified in the floor map in Block S120 and for which manual confirmation has been received though the operator portal. In another example, the system can: calculate a confidence score that a structure identified in the floor map represents a shelving structure (or other storage element) in Block S120; and then define a set of waypoints adjacent each structure detected in the floor map and for which a shelving structure confidence score greater than a minimum threshold (e.g., 40%) has been calculated or for which a confidence score that the structure is a shelving structure exceeds confidence scores for other structure types. Therefore, the system can define waypoints along structures—detected in the floor map—predicted and/or confirmed to represent shelving structures (and/or other storage structures, checkout aisles, etc.) throughout the store. The system can then dispatch the robotic system to collect optical data (e.g., photographic images) of shelving structures (and other structures) adjacent these waypoints throughout the entire store in Block S160 and then process these optical data in bulk to generate a substantially complete planogram of the store, including types and locations of products arranged on a large proportion of shelves, cubbies, tables, etc. throughout the store.

Furthermore, by defining waypoints along uncertain structures (i.e., structures of unknown or low-confidence-score types) within the store in Block S150 and then dispatching the robotic system to these waypoints to collect photographic images of these uncertain structures, the system can access optical data of these unknown structures and process these optical data to determine—with greater confidence—a type of each of these structures, in addition to identifying types and locations of products stocked on these structures.

However, the system can implement any other method or technique to define locations and orientations of waypoints in the store, which the robotic system can later navigate to in sequence during a subsequent imaging routine.

10. Image Collection

Block S160 of the method recites dispatching the robotic system to record optical data at (e.g., while occupying) a first waypoint proximal a first shelving structure, in the set of shelving structures, during a first imaging routine; and Block S170 of the method recites accessing a first image including optical data recorded by the robotic system while occupying the first waypoint. Generally, in Block S160, the system serves the set of waypoints generated in Block S150 to the robotic system for subsequent execution; in Block S170, the system collects optical data (e.g., raw digital photographic color images) captured by the robotic system at these waypoints. For example, the system can transmit the set of waypoints to the robotic system and then download images captured by the robotic system over the Internet via a local wireless network (e.g., via a wireless router installed in the store).

Along with the set of waypoints, the system can also upload a master map of the store to the robotic system, such as in the form of the floor map (or a localization map based on the floor map) and labeled with the coordinate system for the store. During execution of the imaging routine, the robotic system can sequentially navigate through the set of waypoints by: scanning its local environment with its integrated mapping sensor (e.g., a LIDAR sensor); compiling scans from the mapping sensor into a new map of the robotic system's environment; and determining its location within the store's coordinate system by comparing the new map to the master map—defining the coordinate system—of the store. The robotic system can thus navigate to a next waypoint by moving to a position and orientation within the store at which the output of the mapping sensor aligns—within a threshold distance and angle—with a region of the master map corresponding to the (x,y,∂) location and orientation defined in the waypoint. The robotic system can capture a set of images at the waypoint and tag each image—such as with a timestamp, a waypoint ID, an actual (x,y,∂) location and orientation within the store, and an ID of the camera that captured the image—before navigating to a next waypoint. During or upon completion of the imaging routine, the robotic system can upload images to the system for processing in Block S170.

However, the remote computer system and the robotic system can cooperate in any other way and implement any other methods and techniques to asynchronously map and then image shelving structures and other storage elements within the store in separate autonomous mapping and imaging routines.

11. Image Adjustment

Upon receipt of images from the robotic system in Block S170 during or following an imaging routine, the system (e.g., the remote computer system) can assimilate these raw images for subsequent processing in Block S180. In one example, the system dewarps a raw image to remove fisheye effects resulting from a wide-angle lens connected to the camera that recorded the image and then processes this corrected image in subsequent Blocks of the method S100. In another example, the system can: compare the actual position and orientation of the robotic system at the time the raw image was captured (e.g., as stored in image metadata) to the target location and target orientation defined in a nearest waypoint; transform (e.g., skew, dewarp) the raw image to represent a field of view of the camera were the robotic system positioned at the target location and orientation defined in the waypoint; and then processes this corrected image in subsequent Blocks of the method S100. However, the system can modify, dewarp, or otherwise manipulate an image captured by the robotic system in any other way.

In another implementation, the system stitches multiple raw images recorded by the robotic system along multiple adjacent waypoints into a larger (e.g., panoramic) image of one complete shelving structure. In one example, the system: receives a first set of digital photographic images recorded by the robotic system through a set of discrete color cameras integrated into the robotic system while navigating through the first set of waypoints; and assembles the first set of digital photographic images into a larger, composite image of the first shelving structure based on known positions of the set of discrete color cameras within the robotic system and actual positions and orientations of the robotic system within the store while occupying each waypoint in the first set of waypoints. In this example, the system can also: write an address of a center waypoint in the first set of waypoints, a group address of the first set of waypoints, an imaging line vector coincident the first set of waypoints, an aisle containing the first set of waypoints, etc. and a time the first set of digital photographic images were recorded to metadata of the composite image of the first shelving structure. The system can then identify types and locations of products on the first shelving structure by processing the first composite image in subsequent Blocks of the method and can link the first composite image to a virtual representation of the first shelving structure in the planogram based on this address and/or other metadata stored with the first composite image.

Alternatively, in the foregoing implementation, the system can stitch images—recorded by cameras offset vertically along the mast of the robotic system and recorded at one or along a sequence of adjacent waypoints along a particular shelving structure or aisle, etc.—into a single panoramic image of the particular shelving segment or aisle, etc.

12. Image Collection Variations

One variation of the method includes Block S112, which recites, at a robotic system, generating a map of a floor space within a store while autonomously navigating through the store, and Block S114, which recites, at the robotic system, capturing a sequence of images of shelves within the store while autonomously navigating through the store. Generally, the robotic system can locally execute Blocks S112 and S114 to automatically generate a map of the store and to capture images of shelving structures within the store during a single autonomous map-scan routine. In particular, in this variation, the system can autonomously execute mapping and imaging routines within the store substantially simultaneously.

In one implementation, the robotic system intermittently captures images of shelving structures within the store throughout the mapping routine. For example, the robotic system can implement simultaneous localization and mapping techniques to construct and update a floor map of the interior of the store and can simultaneously implement template matching, pattern matching, pattern recognition, and/or other techniques described above to locally identify aisles and shelving structures within the floor map substantially in real-time. In this example, upon identification of shelving structures in the floor map of the store, the robotic system can: automatically implement techniques described above to locally define waypoints along the shelving structure substantially in real-time; pause the mapping routine; and sequentially navigate to each waypoint along the shelving structure and capture a set of images at each waypoint along the shelving structure before resuming the mapping routine. In this implementation, the robotic system can repeat this process throughout the mapping routine to generate a map of the store, to identify shelving structures (and other storage elements) within the store in near-real-time, and to collect images of these shelving structures (and other storage elements) during a contiguous autonomous mapping and imaging routine. The robotic system can then upload map and optical data (e.g., a vectorized 2D floor map and raw images to the system), as described above, for remote processing into a planogram of the store in Blocks S180 and S190.

In another implementation, the robotic system regularly and systematically pauses its current mapping routine to capture a set of images through its integrated cameras. For example, while navigating throughout the store during a mapping routine, the robotic system can pause navigation after traversing a linear distance of approximately one meter, and then: record an image at each camera on one side of its mast; rotate 180° (e.g., a half-turn to the left); record an image at each of its lefthand cameras; rotate −180° (e.g., a half-turn to the right); and then resume the mapping routine. After traveling a subsequent one meter, the robotic system can repeat the foregoing process to capture a set of images at this location before again resuming the mapping routine. In this example, for each image thus recorded during the mapping routine, the robotic system can store: a location and an orientation of the robotic system within the store (e.g., relative to a coordinate system defined in the floor map currently under construction at the robotic system) at a time the image was captured; an address of the camera that captured the image; a timestamp the image was recorded; etc. in image metadata. Upon completion of the mapping routine, the robotic system can offload the floor map, images, and image metadata to the system in Blocks S120 and S170. The system can then: implement methods and techniques described above to detect shelving structures and other storage elements in the floor map; project locations, orientations, and dimensions of these shelving structures and other storage elements onto the known locations and orientations of the robotic system at times these images were recorded to identify groups of images representing the same shelving structures; and then stitch images in each discrete group of images into a panoramic composite image of a corresponding shelving structure.

However, the robotic system can implement any other methods or techniques to autonomously map and image the store while identifying features within the store in real-time during a single mapping routine, or the robotic system can implement any other mapping and imaging routine to systematically collect images during a mapping routine.

13. Image Segmentation

Figure 5:
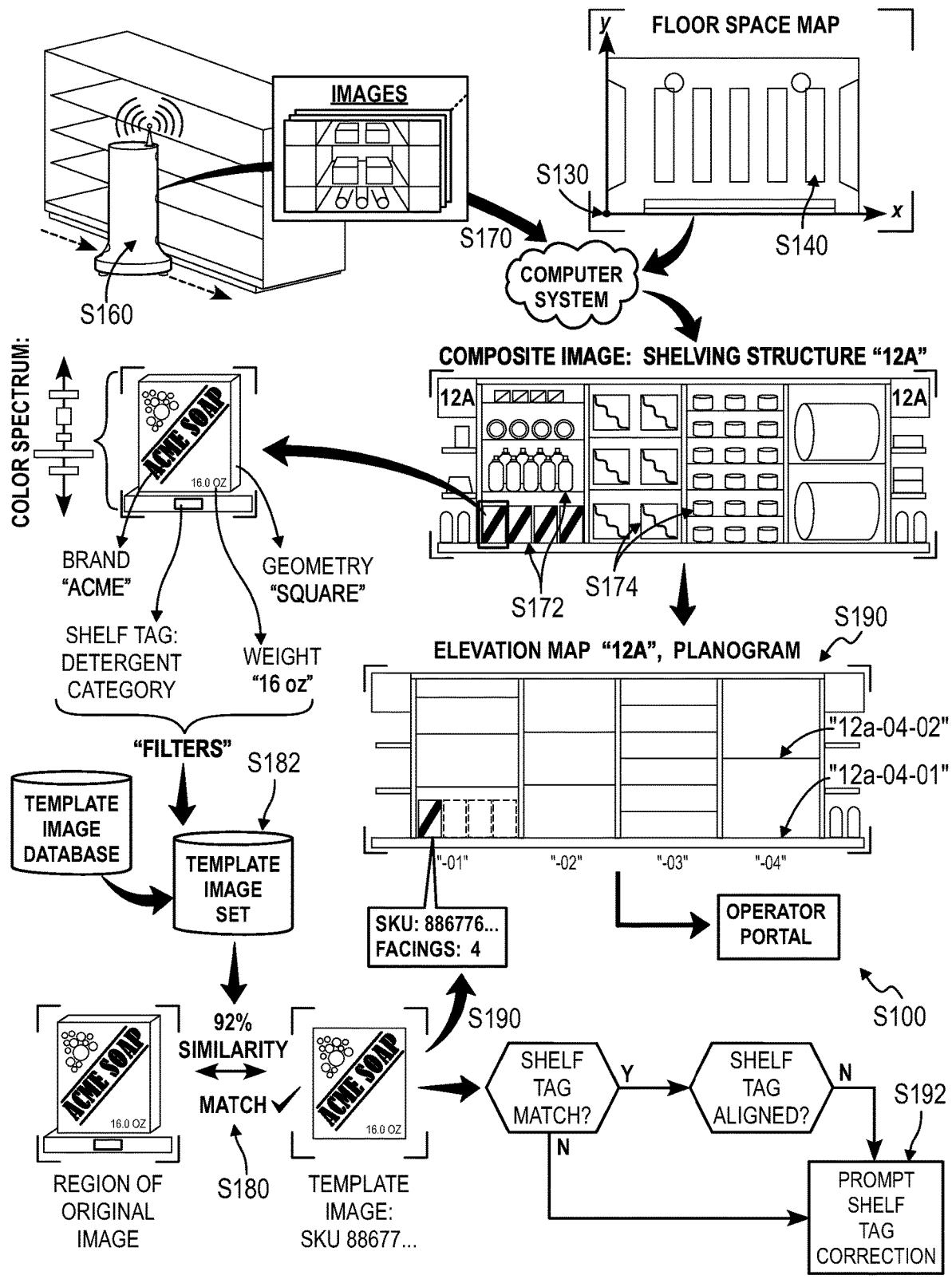
FIG. 5 is a flowchart representation of one variation of the method.

As shown in FIGS. 1 and 5, one variation of the method includes: Block S172, which recites detecting a first shelf at a first vertical position in the first image; and Block S174, which recites detecting a first object in a first lateral position over the first shelf in the first image. Generally, in Blocks S172 and S174, the system identifies a shelving structure, a shelving segment within the shelving structure, a shelf within the shelving segment, an object arranged over the shelf, a shelf tag arranged on the shelf, and/or any other features in an image received from the robotic system in Block S170. From these features, the system can identify both a product type of the object and its vertical and horizontal location on the shelving structure in Block S180, which the system can then transform into a planogram of the shelving structure in Block S190.

13.1 Shelving Structure Segmentation

In one implementation, the system implements computer vision techniques to distinguish a shelving structure represented within an image (e.g., a panoramic image of a shelving structure containing multiple shelving segments) in Block S172. In one example, the system scans the image for an area of interest including the shelving structure and crops the image around this area of interest, such as by: cropping the image vertically between a lowermost linear edge and an uppermost (linear or nonlinear) edge shown in the image in order to remove areas of the image representing a floor surface in front of the shelving structure and a ceiling and open volume above the shelving structure; and then cropping the image horizontally between a leftmost linear edge and a rightmost linear edge—meeting adjacent ends of the lower and upper edges—shown in the image in order to remove areas of the image to the left and to the right of the shelving structure. In another example, the system can implement template matching, object recognition, or other techniques to identify the shelving structure in the image and to crop the image around the shelving structure.

In the implementation described above in which the system (e.g., the remote computer system or the robotic system) generates a 2D floor map of the store, such as in the form of a vectorized plan map of the floor space in the store, the system can also: align the image to the 2D floor map based on known locations and orientations of the robotic system when these visual data were recorded by the robotic system; associate a shelving structure represented in the image with a shelving structure detected or confirmed in the 2D floor map; project the lateral bounds of the shelving structure from the 2D floor map onto the image to predict locations of outer vertical edges of the shelving structure in the image; implement edge detection or other computer vision techniques to scan the image—around these projected lateral bounds of the shelving structure—for edges representative of the outer vertical edges of the shelving structure shown in the image; and then crop the shelving structure laterally between these leftmost and rightmost edges of the shelving structure shown in the image.

Similarly, in the implementation described above in which the system generates a 3D floor map of the store, such as in the form of a 3D point cloud or vectorized 3D map of the interior volume of the store, the system can: align the image to the 3D floor map based on known locations and orientations of the robotic system when these visual data were recorded by the robotic system; associate a shelving structure represented in the image with a shelving structure detected or confirmed in the 3D floor map; project the vertical and lateral bounds of the shelving structure from the 3D floor map onto the image to predict the location of the perimeter of the shelving structure in the image; implement edge detection or other computer vision techniques to scan the image—around these projected perimeter of the shelving structure—for upper, lower, leftmost, and rightmost edges representative of the perimeter of the shelving structure shown in the image; and then crop the shelving structure laterally between these upper, lower, leftmost, and rightmost edges of the shelving structure shown in the image.

Therefore, the system can crop an image (e.g., a correct or panoramic image)—generated from optical data collected by the robotic system while navigating along a shelving structure—around features in the image representing outer bounds (e.g., the edge, the perimeter) of the shelving structure. However, the system can implement any other method or technique to identify a shelving structure in an image (e.g., a corrected or composite image) in Block S172. The system can repeat this process for each corrected image or panoramic image of shelving structures or other storage elements within the store.

13.2 Shelving Segment Segmentation

Upon detecting the shelving structure in the image, the system can further distinguish a shelving segment—within the shelving structure—represented within the image in Block S172. In one example, after detecting features representing the shelving structure in the image and cropping the image around this area of interest, the system: scans the area of interest in the image for (approximately) continuous vertical lines, such as by extracting substantially vertical and substantially linear curves extending from proximal the bottom to proximal the top of the area of interest; and associates these vertical, linear curves with vertical edges of shelving segments in the shelving structure represented in the area of interest in the image. The system then: delineates a region between two adjacent vertical shelving segment edges—offset by a real distance approximating a known or common width of shelving segments in shelving structures—in the area of interest in the image; and labels this region as representing a single shelving segment.

The system can repeat this process for each other pair of adjacent vertical shelving segment edges detected in the image to segment the image into multiple discrete regions representing discrete shelving segments in the shelving structure. However, the system can implement any other method or technique to identify one or more shelving segments within an image (e.g., a corrected or composite image cropped around a shelving structure) in Block S172.

13.3 Shelf Segmentation

Once the system detects a shelving structure and/or a shelving segment in the image, the system can further segment the image into regions corresponding to areas or volumes above discrete shelves within a shelving segment in the shelving structure identified in the image.

In one example, the system implements methods and techniques described above to crop a composite image of a first shelving structure around a first shelving segment identified in the image. In this example, the system then: detects features in the cropped image; extracts—from this set of features—a first linear feature extending laterally across (substantially a full width of) the cropped image; extracts—from this set of features—a second linear feature extending laterally across (substantially the full width of) the cropped image and offset below the first linear feature by a distance approximating a common shelf thickness or a known shelf thickness of shelving structures throughout the store; and correlates the first linear feature and the second linear feature with a first shelf in the first shelving segment—that is, the upper leading edge and the lower leading edge of the first shelf. In this example, the system can similarly: extract—from this set of features—a third linear feature extending laterally across the cropped image and offset above the first linear feature; extract—from this set of features—a fourth linear feature extending laterally across the cropped image and offset below the third linear feature by a distance approximating the common or known shelf thickness; and correlate the third linear feature and the fourth linear feature with a second shelf—above the first shelf—in the first shelving segment.

In the foregoing example, the system can then define a first region of the cropped image extending from proximal the first linear feature to proximal the fourth linear feature above and extending across the full width of the image cropped to the width of the first shelving segment. The system can thus delineate the first region in the image—cropped or otherwise bounded around the first shelving segment—that corresponds to an accessible shelf volume above the first shelf in the first shelving segment in the first shelving structure. The system can repeat this process for each other shelf identified in the first shelving segment and in each other shelving segment in the first shelving structure identified in the image to delineate a set of regions in the image, wherein each region represents an area or volume above one shelf in the first shelving structure.

Therefore, the system can delineate multiple shelves in multiple shelving segments within one corrected or panoramic image of a single shelving structure—generated from optical data collected by the robotic system while navigating along a shelving structure. However, the system can implement any other method or technique to identify a shelf in an image in Block S172. The system can repeat this process for each corrected image or panoramic image of shelving structures or other storage elements within the store.

13.4 Product Segmentation

In this variation, the system can segment an image—cropped or otherwise bounded around a shelving structure, around a shelving segment, or above a single shelf—by discrete objects placed on this shelving structure, shelving segment, or shelf in Block S174.

In one example, the system implements computer vision techniques, such as object detection, to: detect features in a first region of the image cropped around an area or volume above a first shelf; and to detect a set of discrete objects arranged across the first shelf in the first region of the image, such as by identifying edge features delineating bounds of each of these objects. The system can then: extract or delineate a first subregion in the first region of the image or crop the first region of the image around a first subregion corresponding to a first discrete object—in the set of discrete objects—shown in a first position on the first shelf in the image; and repeat this process for other discrete objects detected in the first region of the image to generate a set of discrete image subregions, each representing one discrete object arranged in an unique location on the first shelf.

Alternatively, the system can implement the foregoing methods and techniques to delineate and label subregions in the image representing discrete objects. Once a subregion of an image is cropped or otherwise bounded around an object represented in the image, the system can implement methods and techniques described below to extract features from this subregion and to then identify this object as a unit of a particular product responsive to correlation between these features and features in a template image representing the particular product. However, the system can implement any other methods or techniques to segment an image of a shelving structure or shelving segment around a single shelf represented in the image.

13.4 Slot Segmentation

In this variation, the system can also segment an image—cropped or otherwise bounded around a shelving structure, shelving segment, or shelf—by slots. In one example, the system: implements methods and techniques described above to detect the upper leading edge and lower leading edge of a first shelf in an image cropped around a first shelving segment; detects features in a section of the image between the upper leading edge and the lower leading edge of the first shelf; identifies groups of features along this section of the image as shelf tags affixed to the first shelf; and detects a left edge of each identified shelf tag. For a first region of the image representing the first shelf in the first shelving segment, the system can then associate a subregion of the image 1) extending laterally from the left edge of a first shelf tag to the left edge of a second shelf tag to the right edge of the first shelf tag (or to the right edge of the image) and 2) extending vertically from the upper leading edge of the first shelf to the lower leading edge of a second shelf above (or to the top edge of the image) within a single slot. The system can repeat this process for other subregions in the image to identify and delineate multiple discrete slots in the shelving structure represented in the image.

In this example, the system can also: read a barcode, extract a SKU or other product identifier, and/or read a price from a first shelf tag detected in the image.

By default, the system can treat locations and product types of objects identified on shelves within images of shelving structures throughout the store as "ground truth" or as a "target state" of the store. For example, for a slot delineated in an image based on the location of a shelf tag and that contains all or a portion of an identified object, the system can: treat the location and type of this object—determined from an image of this slot—as the target state of this slot; and flag the shelf tag for correction if the shelf tag is not aligned with the object above or if the shelf tag specifies a product other than the product type of the object determined from the image, as described below. However, if the system determines that an object is not present in a slot—defined according to an adjacent shelf tag—on a shelf, the system can label this slot as empty and treat the location of and product specified by this shelf tag as ground truth for this empty slot. The system can also filter the template image database by one or more product types specified in shelf tags across a shelf and then compare objects detected in an image to template images of this limited number of products in order to improve efficiency of object identification while also accommodating changes to the positions, quantities, and types of objects stocked on shelves throughout the store, as described below.

14. Planogram Initialization

Block S190 of the method recites initializing the planogram of the store, wherein the planogram represents locations of a set of shelving structures within the store based on map data recorded by the robotic system. Generally, in Block S190, the system generates a virtual representation of shelving structures, shelving segments, shelves, etc. identified in images generated from optical data collected by the robotic system during the imaging routine, as shown in FIG. 5; the system can then populate the planogram with product identifiers and product quantities (i.e., quantities of product facings) according to products and locations of products identified in these images in Block S180.

For example, in the implementation described above in which the system delineates a shelving structure, shelving segments, and shelves in a corrected or panoramic image, the system can generate a virtual visual representation of the shelving structure, including representations of shelving segments and shelves within the shelving structure, such as in the form of an elevation map, chart, graph, or other visual container. Therefore, for a first shelving structure identified in a first image, the system can initialize a first elevation map of a first side of the first shelving structure in the planogram, wherein the first elevation map represents the length and height of the first shelving structure, widths of shelving segments within the first shelving structure, and vertical positions of shelves within these shelving segments, as shown in FIG. 5. The system can also associate the first elevation map of the first shelving structure with a location of the first shelving structure in the store, such as based on the location of the first shelving structure in the floor map.

14.1 Addresses

Once the planogram is initialized with one or more (empty) elevation maps of shelving structures throughout the store, the system can also import or assign a unique address to each shelving structure, shelving segment, shelf, etc. represented in the planogram, as shown in FIG. 5.

For example, the system can: implement optical character recognition to detect an aisle number (e.g., "12") near the upper right corner and/or upper left corner of an image (e.g., a corrected or panoramic image cropped around a shelving structure represented in the image); determine which side of the aisle (e.g., shelving structure "12A" or "12B") is shown in the image based on the location of the robotic system at the time these optical data were recorded and the floor map; and then write this aisle number and side (i.e., a "shelving structure address") to the shelving structure identified in this image. In other examples, the system can: prompt an human operator to manually label shelving structure addresses to each shelving structure (and other storage elements) identified in the floor map; extract shelving structure addresses from an architectural plan of the store, as described above and in U.S. Provisional Patent Application No. 62/339,045, and project these onto the floor map; or implement a predefined shelving structure addressing scheme to automatically assign shelving structure addresses to shelving structures (and other storage elements) detected in the floor map; etc. The system can then write shelving structure addresses from the floor map to images of shelving structures generated from optical data collected by the robotic system based on locations of the robotic systems when these optical data were recorded.

Once the address of a shelving structure represented in an image is thus determined, the system can assign an address to each shelving segment detected in the shelving structure, such as by assigning shelving segment addresses that increase (e.g., increment) from left to right along the shelving structure detected in the image. For example, for a shelving structure assigned the address "12A", the system can: write address "12A-01" to a first, leftmost shelving segment in shelving structure 12A; write address "12A-02"

to a second shelving segment to the right of shelving segment 12A-01 in shelving structure 12A; write address "12A-03" to a third shelving segment to the right of shelving segment 12A-02 in shelving structure 12A; etc.

Furthermore, once the address of a shelving segment in a shelving structure represented in an image is thus assigned, the system can assign an address to each shelf detected in this shelving segment, such as by assigning shelf addresses that increase from bottom to top within the shelving segment. For example, for a shelving segment assigned the address "12A-02", the system can: write address "12A-02-01" to a first, lowest shelf in shelving segment 12A-02; write address "12A-02-02" to a second shelf above shelf 12A-02-01 in shelving segment 12A-02; write address "12A-02-03" to a third shelf above shelf 12A-02-02 in shelving segment 12A-02; etc.

In the variation described above in which the system further segments images by objects and/or slots, the system can implement similar methods and techniques to assign a slot address to each object (i.e., to each object facing at the front of its shelf), to each group of like objects, or to each slot detected along a shelf in an image, such as by assigning increasing slot addresses from left to right along the shelf.

However, the system can implement any other method or technique to assign an address to each shelving structure, shelving segment, shelf, object, group of objects, and/or slots in images generated from optical data collected by the robotic system.

The system can then import shelving structure, shelving segment, shelf, and/or slot addresses from these images onto corresponding shelving segment, shelf, and/or slot locations within elevation maps of corresponding shelving structures. (Alternatively, the system can write these shelving structure, shelving segment, shelf, and/or slot addresses directly to elevation maps of shelving structures in the planogram.)

15. Product Identification

Block S180 of the method recites identifying the first object—in a set of objects detected on the first shelf—as a unit of a first product based on features extracted from a first region of the image representing the first object. (Block S180 of the method can similarly recite identifying products and positions of products in the set of images.) Generally, the system can execute Block S180 to detect the presence of a unit of a product on a shelving structure by implementing computer vision techniques to match a template image to a region in an image of the shelving structure and/or by reading product identification data directly from the image of the shelving structure. The system is described below as processing a 2D panoramic image (or "composite image") of a single shelving structure constructed from images captured by the robotic system, as described above. However, the system can process individual 2D images, 3D volumetric color maps, and/or image data in any other format in Block S180.

In one implementation, the system identifies a first shelf in an image in Block S172 and then detects a first object on the first shelf in Block S174, as described above. In this implementation, the system then: extracts a first set of features from the first region of the image, as described below; and then identifies the first object as a unit of a first product in response to correlation between features—in the first set of features—and features in a first template image, wherein the first template image represents the first product (e.g., contains visual or other data representative of the first object) and is stored in a database of multiple (e.g., millions) template images of known products.

13.1 Template Image Database

In one implementation, the system maintains a database of template images, wherein each template image in the template image database: is associated with an identifier of a product (e.g., a SKU); and includes a photographic or graphical (e.g., computer drafted) representation of all or a portion of the product or packaging of the product. Each template image in the template image database can also be tagged with a product description, supplier, supply period, graphics release date, secondary graphic, barcode, color palette, packaging profile (e.g., packaging shape and size), and/or other quantitative or qualitative product packaging feature or descriptor. Furthermore, each template image in the template image database can be tagged with a product packaging orientation. For example, for one product associated with a particular SKU and packaged in a six-sided box, the template image database can include: a first template image squarely showing the front (or "primary") face of the box and tagged accordingly; a second template image squarely showing the rear face of the box and tagged accordingly; a third template image squarely showing the right face of the box and tagged accordingly; a fourth template image squarely showing the left face of the box and tagged accordingly; a fifth template image squarely showing the top face of the box and tagged accordingly; and a sixth template image squarely showing the bottom face of the box and tagged accordingly. In this example, the template image database can further include: a seventh template image showing the box angled to evenly expose both the front face and right face of the box and tagged accordingly; an eighth template image showing the box angled to expose the front face, right face, and top face of the box and tagged accordingly; etc. For each product represented in the template image database, the template image database can also contain: multiple template images representing various lighting conditions on a representative unit of the product; damaged examples of the product packaging (e.g., dented cans, torn boxes); and/or seasonal product packaging (i.e., product packaging supplied during particular seasons or periods of time); etc.

In one variation, rather than optical data, template images in the template image database can include multi-dimensional matrices or vectors representative of visual features on product packagings. For example, the system can: aggregate and maintain a database of stock and field images of products; implement computer vision techniques to extract features from these stock and field images and to transform these features into multi-dimensional vectors; and then populate the template image database with template images in multi-dimensional vector form. Thus, in this example, the system can: retrieve a set of multi-dimensional vectors in Block S180, wherein each multi-dimensional vector in the set of multi-dimensional vectors defines features representative of a product in a list of products assigned to a shelf, shelving segment, or shelving structure, etc. When matching a multi-dimensional vector in this set to a product represented in an image of the shelf, shelving segment, or shelving structure, the system can: segment a first subregion of the image representing a shelf in a shelving segment in Block S172; identify a first subregion in a first region of the image bounding a first discrete object in the image in Block S174; implement computer vision techniques to detect and extract a first set of features—including geometry, color, and/or text features, etc. from the first subregion in the first region of the image; and calculate a composite score for correlation between features in the first set of features extracted from the first subregion of the image and features defined by a first multi-dimensional vector, in the set of multi-dimensional vectors retrieved from the template image database, representing a first product; and then identify the first object represented in the first subregion of the image as a unit of the first product in Block S180 if the composite score exceeds a threshold score.

However, the template image database can include template images representing any other views of a product or product packaging and including (e.g., tagged with) any other relevant data.

13.3 Template Matching

The system can implement computer vision techniques to scan a template image—from the template image database or from a subset of template images selected from the database, as described below—across the composite image and to match a template image to a region in the composite image, as shown in FIG. 1. For example, the system can implement template matching, edge detection, pattern matching, pattern recognition, optical character recognition, color recognition, content-based composite image retrieval, pose estimation, code reading, shape recognition, and/or any other suitable method or technique to detect an object—corresponding to a unit of a product—in the composite image and to match this object to a labeled template object shown in a template image. In this implementation, the system can implement computer vision techniques to identify a region in the composite image that visually matches a particular template image within a threshold confidence interval (and that better matches the particular template image than other template composite images in the database). The system can then tag this region of the composite image with a SKU or other product identifier, a packaging side, a packaging orientation, a product description, a supplier, a supply period, a graphics release date, and/or any other data stored within the particular template image. The system can repeat this process to match the same and/or other template images in the template image database to other regions in the composite image and to similarly tag these other regions in the composite image with data from matched template images.

In the foregoing implementation, the system can compare a first region (e.g., features extracted from the first region) representing a first object in an image to each template image in the database until a suitable match is found. Alternatively, the system can: aggregate a particular (sub)set of template images from the template image database predicted to match the first object; and/or rank template images in this particular set of template images or the template image database as a whole based on features extracted from the first region and nearby regions of the image, as described below. The system can then systematically compare template images to the first region of the image according to rank or priority of these template images until a match is found, until the set of template images is exhausted, or until another trigger is reached, as described below. The system can repeat this process for each other object detected in the image.

Furthermore, in this example, the system can calculate a score (e.g., a "confidence score," a "similarity score") for a match between a region of the image and a template image in the set of template images, such as proportional to a number of matched features occurring in similar relative positions in the region of the image and the template image. For example, the system can: calculate a similarity score between a first region in the image and each template image in the set of template images; identify the first object represented in the first region as a unit of the first product in response to the similarity score between the first region and a first template image—representing the first product—exceeding all other similarity scores for template images in the set and/or exceeding a preset threshold similarity score. In particular, in the foregoing implementations, the system can identify a first discrete object represented in a first region of the image as a unit of a first product in Block S180 in response to relatively strong correlation between features extracted from the first region of the image and features represented in the first template image representing the first product. The system can then tag the first region of the image with a SKU or other identifier of the product represented by the first template image. Furthermore, if the first template image is tagged with additional data, such as packaging side, packaging orientation, product description, supplier, supply period, graphics release date, packaging damage, etc. of the first product, the system can also copy these data to the first region of the image, such as in the form of tags or image metadata.

Alternatively, in the implementation described below in which the system aggregates a set of template images—from the template image database—predicted to best represent objects in an image, the system can: scan a first template image—in the set of template images—across the width and height of the first region of the image; calculate a best position, a best orientation, and a similarity score for the first template image across the first region of the image; repeat this process for each other template image in the set; and then tag discrete objects detected in the image with product identifiers extracted from template images exhibiting greatest similarity scores (e.g., greater than a threshold similarity score) for similarity to these discrete objects, as shown in FIG. 1. The system can thus tag or associate discrete regions in the image with product identifiers from template images matched (e.g., exhibiting greatest similarity scores over a threshold similarity score) to objects represented in these regions of the image in Block S180.

In the foregoing implementations, if the system fails to calculate a similarity score—that exceeds the threshold similarity score—between an object detected in the image and a template image in the set, the system can expand the set of template images—selected from the template image database for comparison to the first object detected in the image—and attempt to match this expanded set of template images to the first object represented in the image, such as until: a suitable match between the first object and a template image is detected; a maximum processing time has passed; or the system has completed a maximum number of template image comparisons to the first object in the first image; etc.

In the foregoing implementations, the system can implement template matching, edge detection, pattern matching, pattern recognition, optical character recognition, color recognition, content-based image retrieval, pose estimation, code reading, shape recognition, and/or any other suitable method or technique to detect an object in the first region of the image and to match this object to features represented or defined in a template image associated with a particular product. The system can repeat this process to match template images in the set to other regions in the first region of the image and to tag these other regions in the image with data from matched template images. The system can further repeat this process for each other region corresponding to other shelves represented in the image, for other images of each other shelving segment throughout the store, etc.

14. Filtering Template Image Database

In one variation shown in FIG. 5, the system can aggregate a set of template images—from the template image database—representing products most likely to be represented by objects detected in the image in Block S182 and then sequentially compare each template image in this set to an object detected in an image until a suitable match is found in Block S180. The system can additionally or alternatively rank or prioritize template images in this set of template images or in the template image database as a whole based on features extracted from the image near and around the region of the image representing the object.

14.1 Filtering Template Image Database by Store Type

In one implementation, for the template image database that contains template images of a variety of products supplied across a variety of store types (e.g., grocery, clothing, hardware, toy, etc.), the system can filter the template image database by a type of the store. For example, for a grocery store stocked with fresh produce, spices, cooking implements, alcoholic beverages, baked goods, canned goods, boxed foodstuffs, etc., the system can filter the database of ~10,000,000 template images down to ~1,000,000 template images of products commonly stocked in grocery stores and excluding template images of fasteners, woodworking tools, shoes, and other products not typically stocked in grocery stores. The system can further filter the database based on known product categories and brands carried by the store in Block S182, such as based on a list of product categories and brands entered manually by an human operator through the operator portal. In this example, the system can further filter the ~1,000,000 template images down to 100,000 images excluding template images of fresh produce, alcoholic beverages, or cooking implements for the store that does not carry products in these categories.

In another example, the system can filter the template image database according to location of the store in Block S182. In this example, the system can retrieve a geospatial position (e.g., a GPS location) from the robotic system and then filter the template image database based on products sold in this region of the world, such as by aggregating template images of products containing English and Spanish packaging labels for stores in the United States and by aggregating template images of products containing Russian packaging labels for stores in Russia. Similarly, the system can remove—from the set of template images selected for subsequent comparison to images of shelving structures within the store—regional items not (commonly) sold in a region in which the store is located.

The system can thus filter the template image database down to a set of template images of products likely to be stocked or possibly stocked in the store based on a type of the store, product categories carried by the store, brands carried by the store, and/or a geographic location of the store, etc.

14.2 Filtering Template Image Database by Shelving Structure Category

In another implementation, the system can: aggregate a set of template images—from the template image database—of products in a product category associated with a region of the store occupied by a shelving structure or assigned directly to the shelving structure represented in an image in Block S182; and then compare template images in this set of template images to objects detected in this image to identify product types of these objects in Block S180.

For example, an human operator can label product categories of single shelving structures, clusters of shelving structures, or regions in the floor map through the operator portal. Upon identifying a first shelving structure and detecting objects on the first shelving structure in an image, the system can: retrieve a first product category assigned to the first shelving structure by the floor map; and then select a subset of template images—from the template image database—representing products in the first product category. In a similar example, the operator can label an aisle identified in the floor map as a canned goods aisle; the system can thus aggregate a set of template images of canned goods (e.g., a set of 10,000 template images), link this set of template images to both shelving structures facing the aisle, and match regions in images of these two shelving structures with template images in the set to identify canned goods stocked on shelves in these shelving structures.

14.3 Filtering Template Image Database by Nearby Products

Similarly, as the system identifies units of various products in images of one or more adjacent shelving structures, the system predicts a category of products stocked on these shelving structures based on these identified products, such a based on product category metadata associated with these products in a product database. The system can then adjust a set of template images or aggregate a refined set of template images for comparison to other regions in images of these shelving structures based on the product category thus predicted for these shelving structures in Block S182.

For example, the system can: implement methods and techniques described herein to identify a first object—detected in an image of a first shelving structure—as a unit of a first product in Block S180. The system can then identify a first product category of the first product, such as based on a product category associated with the first product in a product database; and retrieve a second set of template images from the database of template images, wherein each template image in the second set of template images represents a product in the first product category. Upon detecting a second object adjacent the first product on the shelving structure represented in the first image, the system can: extract a second set of features from a second region of the image representing the second object; compare template images in this second set of template images to the second set of features; identify the second object as a unit of a second product in response to a similarity score between features in the second set of features and features in a second template image—in the second set of template images—exceeding a threshold score, wherein the second template image represents the second product in Block S180.

Similarly, once the system matches a first template image in the template image database to a region in an image, the system can select similar template images from the database (e.g., template images of the same or similar products, template images of products in the same or similar category) for comparison to other regions in the image. For example, once a first template image of a first product is matched to a first region in the image, the system can compare the first template image to other regions in the image for similar matches, such as to identify a duster of units of the first product on one or multiple adjacent shelves in a shelving structure shown in the image. In this example, if unidentified objects in other regions of the image remain, the system can then compare other template images of the first product—such as template images of the first product but in other orientations and/or in other product packaging versions (e.g., older or seasonal packaging versions)—to other regions in the image for possible matches in Block S180.

Furthermore, if unidentified objects in other regions of the image still remain, the system can select a set of template images representing other products similar or related to the first product, such as: template images of similar products by other brands carried by the store; template images of the same product in different packaging formats (e.g., a bottle of detergent in a smaller or larger size); template images of products of similar types (e.g., other canned goods); template images of products within the same product category; and/or template images of other products historically grouped with the first product and contained in the same or other product category; etc. The system can then compare this expanded set of template images of like products to other regions in the image in Block S180.

The system can therefore selectively aggregate a set of template images and expand or "grow" this set of template images of products for comparison to unidentified objects in an image based on products previously identified in the image.

14.4 Filtering Template Image Database by Brand

The system can also: implement optical character recognition or other computer vision techniques to read text or symbols (e.g., a brand name, a description, a logo) from a first object detected in a first region of an image; select a set of template images labeled with, containing, or otherwise representing similar text or symbols in Block S182; and then compare the first region of the image to template images in this set of template images—selected from the template image database based on textual features extracted from the first region of the image—to identify the first object in Block S180, as described above.

For example, the system can: extract a first textual string from the first region of the image; identify a first brand associated with the first object represented in the first region of the first image based on the first textual string; and retrieve a first set of template images from the database of template images, wherein each template image in the first set of template images represents a product associated with (e.g., sold by) the first brand in Block S180. The system can then: compare a first set of features extracted from the first region of the image to template images in the set of template images; and identify the first object as a unit of a first product in response to a similarity score between features in the first set of features and features in a first template image—in the first set of template images and representing the first product—exceeding a preset threshold score in Block S180.

The system can also extract other textual data from a first region of an image representing a first detected object, such as: product size or weight (displayed proximal a bottom of product packaging); a slogan; and/or a product description, etc. The system can then: aggregate a set of template images tagged with or defining features containing similar textual data; and compare this set of template images to the first region of the image to identify the first object.

14.5 Filtering Template Image Database by Color Values

In another implementation, the system: extracts a predominant color or a representative spectrum of relative color values from a first region of an image; and then aggregates a set of template images exhibiting or otherwise associated with a similar predominant color or a similar representative spectrum of relative color values in Block S182.

For example, the system can: extract a first color spectrum of relative color values from a first region of an image representing a first object; retrieve a first set of template images from the database of template images, wherein each template image in the first set of template images exhibits a color spectrum of relative color values approximating the first color spectrum of relative color values in Block S182; compare the first set of features extracted from the first region of the image to template images in the set of template images; and then identify the first object as a unit of a first product in response to a similarity score between features in the first set of features and features in a first template image—in the first set of template images and representing the first product—exceeding a threshold score in Block S180. Therefore, the system can filter the template image database to aggregate a small set of template images more likely to represent a product shown in a region of an image based on a predominant color or cluster of colors extracted from this region of the image in Block S182.

14.6 Filtering Template Image Database by Object Shape

The system can also extract a shape or geometry of an object represented in a region of the image, such as a rectilinear box or a cylindrical can or bottle, and select a set of template images—from the template image database—corresponding to products of similar shapes or geometries in Block S182. For example, the system can: implement edge detection and/or other computer vision techniques to detect a perimeter edge of a first object shown in a first region of an image; characterize the geometry of the first object according to the perimeter edge detected in the first region of the image; characterize a scale of the first object (e.g., relative to a thickness of a shelf on which the first object is stored or relative to a dimension of an adjacent shelf tag shown in the image); and aggregate a set of template images of products of similar geometries and/or scale in Block S182.

14.7 Filtering Template Image Database by Shelf Tag Data

In another implementation, the system: implements computer vision techniques to detect a shelf tag (e.g., a product label) on a shelf identified in an image; reads a barcode, QR code, SKU, product description, and/or other product identifier from the shelf tag; selects a set of template images tagged with the same barcode, QR code, SKU, product description, and/or other product identifier in Block S182; and then compares template images in the set of template images to a first region in the image—adjacent (e.g., immediately above and to the right of) the shelf tag—to identify an object detected in the first region of the image in Block S180. The system can therefore filter the template image database by a singular product indicated by a shelf tag in Block S182 and compare the resulting set of template images to an adjacent region of the image in Block 180.

Alternatively, the system can aggregate a list of products specified by multiple shelf tags identified in an image and aggregate a set of template images of these products—from the template image database—for comparison to multiple objects detected in the image. For example, the system can: a first shelf in a first vertical position in a shelving structure identified in an image in Block S172; detect a second shelf at a second vertical position—offset from the first position—in the image in Block S172; detect a set of shelf tags arranged along the first shelf and the second shelf in the image; extract a set of product identifiers from the set of shelf tags represented in the image, as described above; and then retrieve a first set of template images from the database of template images in Block S180, wherein each template image in the first set of template images defines visual features of a product specified in the set of product identifiers. The system can then compare each object detected in the image to template images in this set to identify products stored on the shelving structure represented in the image. (In this example, the system can also append the set of template images with template images of product sold by the same or similar brands and/or products similar or related to products indicated by shelf tags identified in the image.)

However, the system can implement any other method or techniques to systematically expand and/or contract a set of template images—from the database of template images— for comparison to unidentified objects in an image based on features extracted from the image, from images of other shelving structures in the store, or from the floor map of the store, etc.

15. Ranking

The system can also rank a set of template images selected for comparison to a region of an image (or rank template images in the template image database as a whole) in Block S182 based on various parameters described above.

In one example, the system ranks, prioritizes, or filters a set template images—for comparison to a first region in an image—according to similarities between a predominant color or a representative spectrum of relative color values in these template images and the first region of the image. Similarly, the system can: implement optical character recognition, object detection, or other computer vision techniques to extract text and/or object geometry from the first region of the image; and then rank, prioritize, or filter the set template images for comparison to the first region according to similarities between text shown on and/or the geometry of products represented in the template images and in the first region of the image.

However, the system can rank, prioritize, or filter the set of template images (or the template image database as a whole) for comparison to a first region of an image based on any other feature read or extracted from the image or images of shelving structures nearby. The system can then sequentially compare template images to the first region of the image according to rank or priority until a match is found, until the set of template images is exhausted for the first region, or until another trigger is met, as described above. The system can repeat this process for each other region in the image.

Furthermore, the system can implement any other methods or techniques to identify products arranged in a shelving structure shown in an image.

16. Multiple Facings

In one variation shown in FIG. 5, the system: detects a cluster of objects on a shelf in an image; identifies each object in this duster of objects as a unit of a first product based on features extracted from a region of the image representing this duster of objects; generates a count of units of the first product in the cluster of objects; and extracts an arrangement of objects in the cluster of objects from this region of the image in Block S180. In this implementation, the system can then write the count, the arrangement, and an identifier of the first product to a first slot—corresponding to the location of the duster of objects on the shelf—in the planogram. In particular, in this variation, the system can group multiple units of the same product detected on shelf in an image into a single slot on the shelf, count the number and arrangement (e.g., horizontal rows, vertical columns) of units of the product in this group, and assign this product, the quantity of units of the product, and the arrangement of these products to a corresponding slot in the planogram. The system can thus detect units of the same product that are stacked in columns or arranged in immediately-adjacent (e.g., touching) rows on one shelf in a shelving structure, determine that these units represent a single slot based on proximity and likeness of these units, and write a product specification to a corresponding slot in the planogram accordingly.

For example, in response to detecting six units of a particular product in three adjacent horizontal rows, each with a stack of two units of the particular product, the system can generate a slot specification defining six facings of the particular product in a 2×3 layout and write this slot specification to a corresponding slot in the planogram. However, the system can implement any other method or technique to group adjacent units of a common product identified in an image into a single slot assigned multiple units of the common product (e.g., rather than multiple discrete slots, each assigned a single facing of the product).

17. Manual Shelf Tagging

In one variation, the system can flag a region of an image for manual product identification if the system fails to match an object shown in this region to a template image, such as to at least a threshold similarity score for the entire database of template images, for the set of template images selected for the region of the image, before a preset maximum number of template image comparisons are made for the region of the images, and/or before a preset maximum processing time for the region of the image has passed. The system can then: generate a prompt requesting manual identification of an object in the region and a link to the region of the image or a copy of the region of the image; serve the prompt to an human operator, such as through the operator portal; and then label an object in the region of the image according to a product identifier supplied by the human operator, such as by entering a SKU of the product or navigating through a set of dropdown menus to select the product.

For example, the system can: detect a second object in a second lateral position over a first shelf identified in an image of a first shelving structure; extract a second set of features from a second region of the image representing the second object; and label the second object as unknown in response to lack of a template image—in the database of template images or in a set of template images selected for comparison to the image—defining features exhibiting at least a threshold similarity to features in the second set of features in Block S180. In this example, the system can then project a second vertical position and a second lateral position of the second object onto the planogram to define a second slot on the first shelving structure in Block S190; generate a prompt to manually label the second object; and serve the prompt and the second region of the image representing the second object to an operator portal. The operator can then identify the second object directly. Alternatively, the operator can tag the second region of the image with a product category, a brand, or other data representative of the second object; the system can then aggregate a new set of template images for comparison to the second region of the image based on the parameters and repeat Block S180, as described above, to identify the second object based on these data supplied by the operator.

18. Product/Shelf Tag Disagreement

In one variation, the system detects discrepancies between a product identified in an image and a shelf tag detected nearby and then selectively treats either the identified product or the shelf tag as a target state (e.g., a "ground truth") for the corresponding slot on the corresponding shelf.

In one implementation, the system: identifies a first object in an image as a first product by implementing template matching techniques to match the first object to a first template image of the first product in Block S180; detects, in the image, a first shelf tag on the first shelf adjacent (e.g., immediately below and/or slightly to the left of) the first object; and extracts a second product identifier (e.g., a product description, a SKU) from the first shelf tag represented in the image, as described above. In this example, if the second product identifier indicates other than the first product, the system can: label the unit of the first product identified in the image as ground truth, such as if the first object is properly oriented on its shelf and represents a current packaging variation or current packaging format of the first product; write an identifier of the first product to a corresponding slot in the planogram in Block S190; generate a prompt to correct the first shelf tag to indicate the first product; and serve this prompt to a manager portal. However, in this example, if the first object is misoriented (e.g., not square to the shelf it occupies) or represents a previous or outdated packaging variant of the first product (e.g., packaging from a previous season or previous design for the first product), the system can label the second product identifier extracted from the first shelf label as ground truth and write the second product identifier to the corresponding slot in the planogram in Block S190.

In the foregoing example, if the unit of the first product identified in the image matches the second product identifier extracted from the adjacent shelf tag in the image, the system can check vertical alignment between the unit of the first product and the shelf tag. For example, the system can: calculate an horizontal distance between the left edge of the unit of the first product and the left edge of the adjacent shelf tag; and write an identifier of the first product and data extracted from the first shelf tag in the image to a corresponding slot in the planogram if this horizontal distance is less than a preset difference threshold. However, if this horizontal distance exceeds the preset difference threshold and confirmation was provided of a desired stocking condition of the store prior to the imaging cycle, the system can: label the unit of the first product identified in the image as ground truth; write an identifier of the first product to a corresponding slot in the planogram in Block S190; and generate a prompt to move the first shelf tag into vertical alignment with the unit of the first product on the shelf; and serve this prompt to the manager portal.

In another implementation, the system can: calculate a similarity score (e.g., a confidence score) for similarity between a first object detected in a first region of an image and template images selected from the template image data; and match the first object to a first template image for which a greatest similarity score is calculated. If the similarity score of the first template image falls below a preset minimum score, the system can: extract a second product identifier from a first shelf tag adjacent the first object in the image; treat the second product identifier as ground truth (i.e., rather than the first template image); and write the second product identifier to the corresponding slot in the planogram (and/or prompt an human operator to manually identify the first object in the image, as described above). However, if the similarity score of the first template image exceeds the preset minimum score, the system can identify and confirm the first object as a first product represented by the first template image, as described above.

The system can additionally or alternatively fuse various techniques described above to identify objects in the image. For example, the system can first detect shelf tags shown in the image and implement optical character recognition techniques to read product identifiers from these shelf tags. If a product identifier is read from a shelf tag to a suitable degree of confidence, the system can write this identifier to a corresponding slot in the planogram. However, if a product identifier is read from a shelf tag with less than a threshold degree of confidence, the system can implement template-matching techniques described above to identify an object in an adjacent region of the image. Similarly, if multiple possible product identifiers are read from a shelf tag or an incomplete product identifier is read from the shelf tag, the system can select a set of template images—from the image template database—corresponding to these possible product identifiers or to this partial product identifier and then compare these template images to regions in the image in Block S180, as described above.

19. Empty Slot

In another variation, the system can identify an empty slot (i.e., a region of a shelf devoid of product) in an image. For example, the system can: detect, in an image, an open region laterally offset from a first object identified on a first shelf; detect, in the image, a second shelf tag on the first shelf adjacent the open region; and extract an identifier of a second product from the second shelf tag represented in the image in Block S180. In this example, the system can then: project the first vertical position of the first shelf and a second lateral position of the open region on the first shelf onto a representation of the first shelving structure in the planogram to define a second slot; and write an assignment for the second product—determined from data extracted from the adjacent shelf tag—to the second slot in the planogram.

In the foregoing example, the system can thus: identify a first shelf in an image in Block S172; identify a first object in a first region of the image as a unit of a first product in Block S180; identify a second region in the image adjacent the first region; extract a second set of features from the second region of the image in Block S174; and detect omission of an object (e.g., a unit of any product) from a second section of the first shelf represented by the second region of the image in Block S180 in response to the second set of features exhibiting a similarity to a template image of an empty shelf or exhibiting proximity to features of known empty shelves. In this implementation, the system can also predict that this second section of the first shelf is improperly stocked (i.e., rather than intentionally left empty) if a shelf tag is detected under the second section of the first shelf. If the system determines that the second section of the first shelf is empty, the system can flag a corresponding slot in the planogram for manual review. Furthermore, if the system identifies a shelf tag under the second section of the first shelf, the system can extract a product identifier from this shelf tag and write this product identifier to the corresponding slot in the planogram, as described above. (The system can generate a restocking prompt for refilling the empty slot, such as with a number of units specified in the adjacent shelf tag.) However, the system can detect and handle empty slots or empty shelves in any other way in Block S180.

20. Planogram Generation

Figure 2:
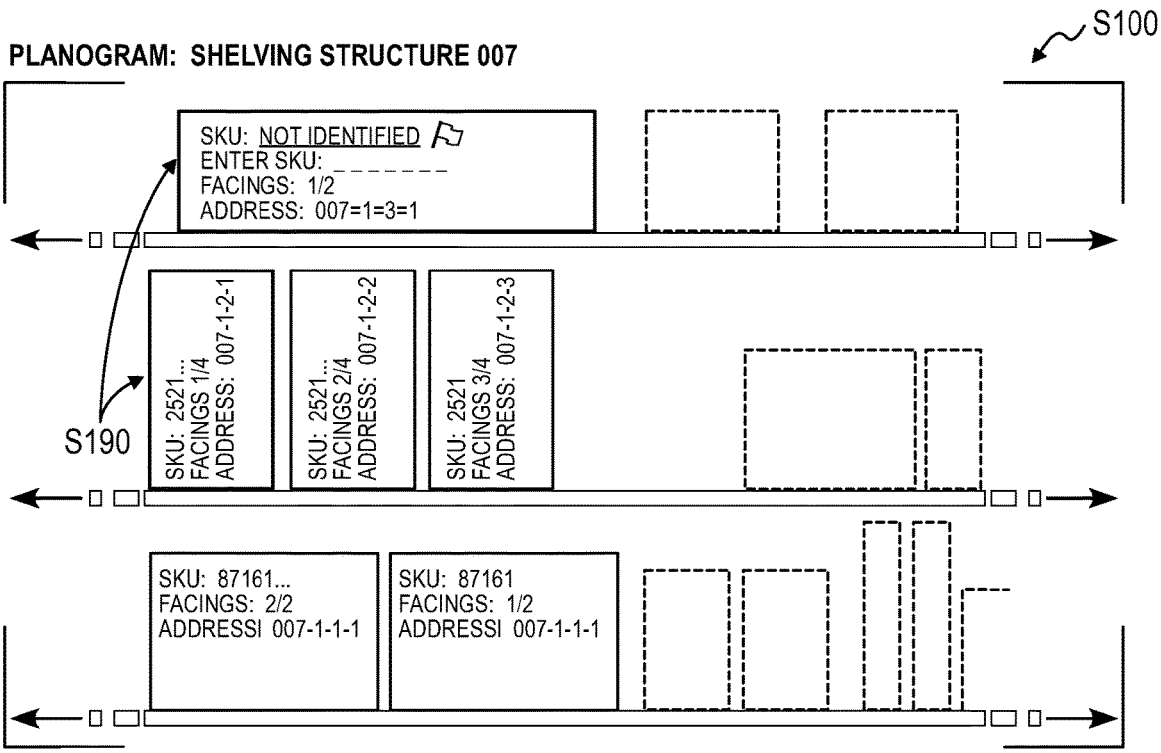
FIG. 2 is a graphical representation of one variation of the method.

Block S190 of the method further recites projecting the first vertical position of the first shelf and the first lateral position of the first object onto a representation of the first shelving structure in the planogram to define a first slot and writing an assignment for the first product to the first slot in response to identifying the first object as the unit of a first product. (As shown in FIGS. 1 and 2, Block S190 can similarly recite generating a planogram of the shelving segment based on products and positions of products identified in the set of images.) Generally, in Block S190, the system compiles product identifiers (e.g., SKUs) and positions of products identified in an image into a virtual representation of the products and locations of products (e.g., a "product layout") on the elevation map of the corresponding shelving structure contained in the planogram of the store. In particular, once the system initializes a planogram of the store by defining an elevation map of a shelving structure identified in the floor map, the system can define slots in this elevation map and populate these slots with product identifiers (e.g., SKUs), quantities of products (e.g., numbers of product facings), product arrangements, and/or other product specification data extracted from corresponding regions of an image of this shelving structure. The system can additionally or alternatively populate the elevation map of the shelving structure with (real or caricature) stock images of these products according to quantities and arrangements of these products identified in the image of the shelving structure in order to form a virtual visual representation of the shelving structure. The system can repeat this process for other shelving structures in the store in order to generate a complete planogram of the store, including elevation maps of each of these shelving structures.

In one implementation, the system implements computer vision techniques to identify the top, bottom, and ends of a shelving structure shown in an image and initializes a 2D vectorized elevation map of the shelving structure with vectorized representations of the top, bottom, and ends of the shelving structure. The system can also: implement computer vision techniques to identify a shelving segment and shelves in the image, such as based on positions of shelf tags identified in the image or by identifying vertical (e.g., shelving segment edges) and horizontal (e.g., shelf edges) edges in the image; and insert vectorized representations of these shelving segments and shelves into the elevation map of the shelving structure, as described above. The system then transfers product identifiers (e.g., SKUs) and positions of units of products identified in the image to corresponding regions (or "slots") in the 2D vectorized elevation map of the shelving structure. For example, the system can: access an image of a first shelving structure in Block S170; detect a first shelf in the image at a first vertical position in Block S172; detect a first object in the image at a first lateral position on the first shelf in Block S174; project the first vertical position of the first shelf and the first lateral position of the first object onto a representation of the first shelving structure in the planogram (e.g., a first elevation map of the first shelving structure) to define a first slot in Block S190; and then write an assignment for the first product to the first slot in the planogram (e.g., to the first slot in the first elevation map) in Block S190 in response to identifying the first object as the unit of a first product in Block S180. In this example, the system can also: detect a second object in a second lateral position over the first shelf in the image, such as adjacent the first object; project a second vertical position and a second lateral position of the second object detected in the image onto the planogram of the first shelving structure (e.g., onto the first elevation map of the first shelving structure) to define a second slot in the planogram; and write an assignment for the second product to the second slot in Block S190 in response to identifying the second object as a unit of a second product in Block S180. The system can therefore transfer product identifiers extracted from an image of a shelving structure onto corresponding regions of a planogram (e.g., an elevation map) of this shelving structure in Block S190.

Furthermore, for a first product thus assigned to a first slot in the first elevation map (or other planogram format) of the first shelving structure in the planogram, the system can also: retrieve a first stock image of the first product, such as from a general stock image database or by retrieving the first stock image from a manufacturer's or supplier's database of stock images; and copy this first stock image to the first slot in the first elevation map. For example, the system can snap the bottom edge of the first stock image to the top of a first shelf represented in the elevation map and set the horizontal position of the stock image based on the location of the unit of the first product identified in the image of the first shelving structure. The system can repeat this process for other products identified in the image of the first shelving structure, thereby visually representing each of these products in the elevation map of the first shelving structure. (The system can also shift stock images of products copied to the elevation map of the first shelving structure laterally across their assigned shelves in order to achieve more uniform spacing between adjacent stock images shown in the planogram.) However, for an object not identified in the image and/or labeled with a flag, the system can copy the region of the image showing the unidentified object into a corresponding region of the planogram, such as with a flag prompting manual identification of the object, as shown in FIG. 2. The system can therefore populate the planogram with both stock images of products identified in an image of a shelving structure and cropped regions of the image corresponding to unidentified objects in the shelving structure.

As described above, the system can automatically label shelving segments and shelves represented in elevation maps of shelving structures in the planogram with unique addresses, as shown in FIG. 2 and described above. For example, the system can implement computer vision techniques to identify vertical breaks in shelves in the image and identify a vertical stack of shelves shown in the image as one shelving segment. The system can map these discrete shelving segments from the image to the planogram and then assign an address to each shelving segment in the planogram. For example, the system can address a leftmost shelving segment in the planogram as shelving segment "1," address a shelving segment immediately to the right of shelving segment "1" in the planogram as shelving segment "2," and so on to the rightmost shelving segment in the planogram. Within each shelving segment, the system also assign an address to each shelf. For example, for shelving segment "1," the system can address a lowest shelf in the shelving segment as shelf "1-1," address a second lowest shelf in the shelving segment as shelf "1-2," address a third lowest shelf in the shelving segment as shelf "1-3," and so on to the top of shelving segment "1." Similarly, for shelving segment "2," the system can address a lowest shelf in the shelving segment as shelf "2-1," address a second lowest shelf in the shelving segment as shelf "2-2," address a third lowest shelf in the shelving segment as shelf "2-3," and so on to the top of shelving segment "2." Based on objects identified across a first shelf represented in an image of a first shelving structure, the system can also define slots across a representation of the first shelf in the first elevation map of the first shelving structure and automatically write unique addresses to these slots. For example, for a lowest shelf of a leftmost shelving structure in a first shelving structure in the store, the system can: write a slot address of "01-01-01-01" to a leftmost slot position—containing a first product identifier—on the first shelf represented in the first elevation map; and write a slot address of "01-01-01-02" to a second slot position—to the immediate right of the leftmost slot position and containing a second product identifier—on the first shelf represented in the first elevation map; and so on across the first shelf. The system can thus populate the planogram with unique addresses of shelving segments, shelves, and slots. However, the system can apply any other address nomenclature or implement any other method or technique to assign addresses to shelving segments, shelves, and slots in the planogram.

The system can also transform a vectorized or visual representation of products arranged on a shelving structure into a textual representation of the shelving structure, such as a table or spreadsheet including: a list of unique product identifiers (e.g., SKUs) and their locations on shelves in the shelving structure; numbers of facings of each product; slot addresses for each product; a product description for each product; and/or a price for each product (e.g., read from a shelf tag, as described above), etc. However, the system can package such planogram data into any other visual and/or textual format.

The system can repeat the foregoing processes for images of each shelving structure (and/or other storage element) within the store, thereby generating a virtual and/or visual representation of a desired stocking condition of each shelving structure (and/or other storage element) in the store, which in aggregate define a planogram of the store.

The system can also generate a planogram layout that defines relative locations of a map elevations (or other virtual or visual representations) of shelving structures within the store. For example, the system can link an elevation map to a shelving structure identified in the floor map based on coordinates stored in metadata of optical data captured by the robotic system and later combined into an image from which the elevation map of the shelving structure was generated. The system can repeat this process to link each elevation map to a shelving structure (or other storage element) in the floor map. In this example, the system can store links between elevation maps and shelving structures in the floor map by assigning an unique shelving structure address to each elevation map and then writing a shelving structure address to a corresponding shelving structure feature in the floor map. However, the system can generate or define a planogram layout for the store in any other format.

The system can then serve the planogram, the planogram layout, and/or select elevation maps of shelving structures in the store to an operator (e.g., a manager or associate of the store), such as through an operator or manager portal, as described above. The system can also interface with the operator through the operator portal to receive edits to the planogram, such as: manual identification of an unidentified object; replacement of one product assigned to a slot in an elevation map for another product, number of product facings, and/or arrangement of products; adjustment of slot positions; adjustment of shelving structure, shelving segment, shelf, or slot addresses; etc. However, the system can serve a planogram and/or other data generated in Block S190 to an operator, manager, employee, or other affiliate of the store in any other way and in any other format.

21. Planogram Implementation

Figure 4:
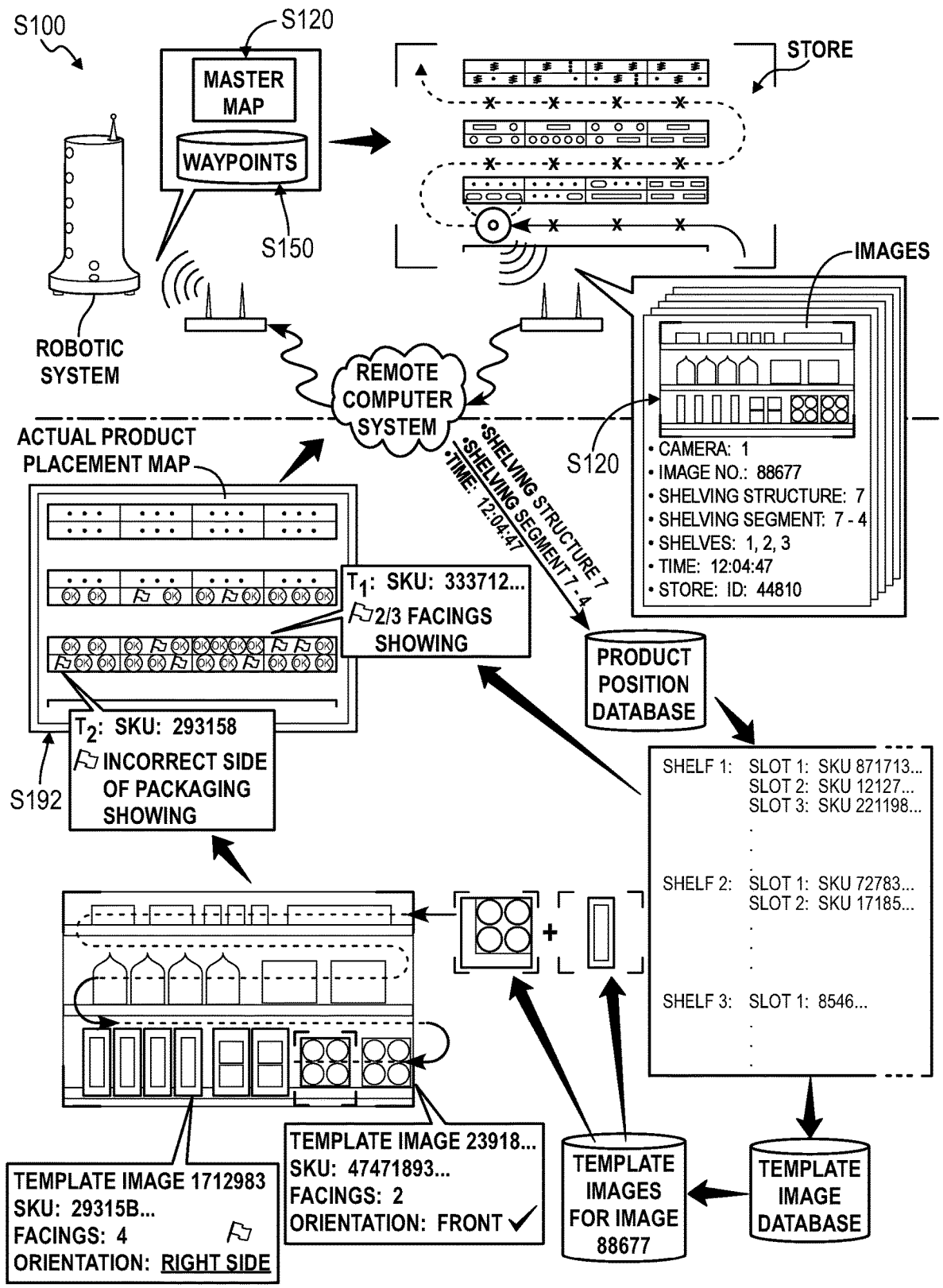
FIG. 4 is a flowchart representation of one variation of the method.

Once the planogram of the store is generated and stored (and adjusted, corrected, or confirmed by an operator), the system can dispatch the robotic system to execute another imaging routine to collect a second set of images of shelving structures (and other storage elements) throughout the store, such as during or following a subsequent high-traffic period in the store. The system can then implement methods and techniques described in U.S. patent application Ser. No. 15/600,527 to identify products in the second set of images, to detect deviations from products and their locations extracted from the second set of images and products and the locations specified in the planogram of the store, and to generate a set of prompts to correct these deviations, such as in the form of a global restocking list served to associates of the store to guide manual restocking of these shelving structures in Block S192, as shown in FIG. 4.

For example, the system can generate a planogram of the store based on optical data collected by the robotic system during a first imaging routine, including assigning a first product to a first slot in a first shelving structure in the field of view of the robotic system while occupying a first waypoint, as described above. The system can later: dispatch the robotic system to execute a second imaging routine; access a second image including optical data recorded by the robotic system while occupying the first waypoint during the second imaging routine; detect a second object in a second region of the second image corresponding to the first slot in the planogram; extract a second set of features from the second region of the second image; determine that a unit of the first product is improperly stocked in the first slot in response to a difference between features in the second set of features and features in template images—in the database of template images—of the first product assigned to the first slot by the planogram; generate a first restocking prompt for the first product in the first slot in response to determining that the unit of the first product is improperly stocked in the first slot; and serve this first restocking prompt to an associate of the store, such as in real-time through a mobile computing device assigned to the associate.

However, the system can manage or implement the planogram in any other way to provide guidance to a manager, operator, or other associate of the store in recording a target stocking condition in the store and monitoring deviation from this target stocking condition over time.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for automatically generating a new planogram assigning products to shelving structures within a store, the method comprising:
dispatching a robotic system to autonomously collect map data of a floor space within the store during a first mapping routine;
initializing the new planogram of the store, the new planogram representing locations of a set of shelving structures within the store based on map data recorded by the robotic system;
in response to receipt of confirmation of a preferred stocking condition in the store, dispatching the robotic system to record optical data at a first waypoint proximal a first shelving structure, in the set of shelving structures, during a first imaging routine;

accessing a first image comprising optical data recorded by the robotic system while occupying the first waypoint;

detecting a first shelf at a first vertical position in the first image;

detecting a first object in a first lateral position over the first shelf in the first image;

identifying the first object as a unit of a first product based on features extracted from a first region of the first image representing the first object;

projecting the first vertical position of the first shelf and the first lateral position of the first object onto a representation of the first shelving structure in the new planogram to define a first slot in the new planogram; and based on confirmation of the preferred stocking condition in the store during the first imaging routine and in response to identifying the first object as the unit of the first product, writing an assignment for the first product to the first slot in the new planogram, the assignment defining a target stock condition of the first slot.

2. The method of claim 1:
further comprising:
receiving map data from the robotic system
transforming the map data into a floor map of the floor space within the store;
defining a coordinate system in the floor map;
identifying a first shelving structure represented in the floor map;
labeling the first shelving structure as a first shelving structure within the store; and
defining a first set of waypoints, relative to the coordinate system, along the first shelving structure, the first set of waypoints comprising the first waypoint and specifying orientations facing the first shelving structure; and
wherein dispatching the robotic system to record optical data at the first waypoint comprises dispatching the robotic system to navigate to each waypoint in the first set of waypoints and to record optical data of the first shelving structure while occupying each waypoint in the first set of waypoints.

3. The method of claim 2:
wherein initializing the new planogram comprises initializing a first elevation map of a first side of the first shelving structure in the new planogram based on a location and a length of the first shelving structure represented in the floor map; and
wherein projecting the first vertical position of the first shelf and the first lateral position of the first object onto the representation of the first shelving structure in the new planogram comprises defining the first slot in the first elevation map based on the first vertical position of the first shelf, the first lateral position of the first object, and a location and an orientation defined by the first waypoint.

4. The method of claim 1, further comprising:
detecting, in the first image, an open region laterally offset from the first object on the first shelf;
in response to detecting the open region on the first shelf:
detecting, in the first image, a second shelf tag on the first shelf adjacent the open region;
extracting an identifier of a second product from the second shelf tag represented in the first image;
projecting the first vertical position of the first shelf and a second lateral position of the open region onto the representation of the first shelving structure in the new planogram to define a second slot; and
writing an assignment for the second product to the second slot.

5. The method of claim 2, wherein accessing the first image comprises:
receiving a first set of digital photographic images recorded by the robotic system through a set of discrete color cameras integrated into the robotic system while navigating through the first set of waypoints; and
assembling the first set of digital photographic images into the first image of the first shelving structure based on known positions of the set of discrete color cameras with the robotic system and actual positions and orientations of the robotic system within the store while occupying each waypoint in the first set of waypoints.

6. The method of claim 1, wherein identifying the first object as the unit of the first product comprises:
extracting a first set of features from the first region of the first image; and
identifying the first object as the unit of the first product in response to correlation between features in the first set of features and features in a first template image, the first template image stored in a database of template images and representing the first product.

7. The method of claim 6:
further comprising:
detecting a second shelf at a second vertical position, offset from the first position, in the first image;
detecting a set of shelf tags arranged along the first shelf and the second shelf in the first image;
extracting a set of product identifiers from the set of shelf tags represented in the first image; and
retrieving a first set of template images from the database of template images, each template image in the first set of template images comprising visual features of a product specified in the set of product identifiers; and
wherein identifying the first object as the unit of the first product comprises:
comparing the first set of features extracted from the first region of the first image to template images in the set of template images; and
identifying the first object as the unit of the first product in response to a similarity score between features in the first set of features and features in the first template image, in the first set of template images, exceeding a threshold score.

8. The method of claim 6:
wherein extracting the first set of features from the first region of the first image comprises extracting a first color spectrum of relative color values from the first region of the first image;
further comprising retrieving a first set of template images from the database of template images, each template image in the first set of template images exhibiting a color spectrum of relative color values approximating the first color spectrum of relative color values; and
wherein identifying the first object as the unit of the first product comprises:
comparing the first set of features extracted from the first region of the first image to template images in the set of template images; and
identifying the first object as the unit of the first product in response to a similarity score between features in the first set of features and features in the first template image, in the first set of template images, exceeding a threshold score.

9. The method of claim 6:
wherein extracting the first set of features from the first region of the first image comprises:
   extracting a first textual string from the first region of the first image; and
   identifying a first brand associated with the first object based on the first textual string;
further comprising retrieving a first set of template images from the database of template images, each template image in the first set of template images representing a product associated with the first brand; and
wherein identifying the first object as the unit of the first product comprises:
   comparing the first set of features extracted from the first region of the first image to template images in the set of template images; and
   identifying the first object as the unit of the first product in response to a similarity score between features in the first set of features and features in the first template image, in the first set of template images, exceeding a threshold score.

10. The method of claim 6, further comprising:
detecting a second object in a second lateral position over the first shelf in the first image;
extracting a second set of features from a second region of the first image representing the second object;
in response to identifying the first object as the unit of the first product:
   identifying a product category of the first product; and
   retrieving a second set of template images from the database of template images, each template image in the second set of template images representing a product in the product category;
identifying the second object as a unit of a second product in response to a similarity score between features in the second set of features and features in a second template image, in the second set of template images, exceeding a threshold score, the second template image representing the second product;
projecting a second vertical position and a second lateral position of the second object onto the new planogram to define a second slot; and
writing an assignment for the second product to the second slot in the new planogram in response to identifying the second object as the unit of the second product.

11. The method of claim 6:
detecting a second object in a second lateral position over the first shelf in the first image;
extracting a second set of features from a second region of the first image representing the second object;
labeling the second object as unknown in response to lack of a template image, in the database of template images, defining features exhibiting at least a threshold similarity to features in the second set of features;
projecting a second vertical position and a second lateral position of the second object onto the new planogram to define a second slot;
generating a prompt to manually label the second object in the new planogram; and
serving the prompt and the second region of the first image representing the second object to an operator portal.

12. The method of claim 6:
wherein writing the assignment for the first product to the first slot in the new planogram comprises generating the new planogram of the store based on optical data collected by the robotic system during the first imaging routine; and
further comprising:
   accessing a second image comprising optical data recorded by the robotic system while occupying the first waypoint during a second imaging routine succeeding the first imaging routine;
   detecting a second object in a second region of the second image corresponding to the first slot in the new planogram;
   extracting a second set of features from the second region of the second image;
   determining that a unit of the first product is improperly stocked in the first slot in the first shelving structure in response to differences between features in the second set of features and features in template images, in the database of template images, of the first product assigned to the first slot by the new planogram; and
   in response to determining that the unit of the first product is improperly stocked in the first slot in the first shelving structure, generating a first restocking prompt for the first product in the first slot.

13. The method of claim 1, wherein dispatching the robotic system to autonomously collect map data of the floor space within the store comprises dispatching the robotic system to execute the first mapping routine within the store following initial delivery of the robotic system to the store and in response to absence of a preexisting planogram of the store.

14. The method of claim 1, further comprising:
detecting, in the first image, a first shelf tag on the first shelf adjacent the first object;
extracting a first product identifier from the first shelf tag represented in the first image;
in response to the first product identifier indicating other than the first product, generating a prompt to correct the first shelf tag to indicate the first product; and
serving the prompt and the first region of the first image representing the first object to a manager portal.

15. The method of claim 1:
wherein detecting the first object comprises detecting a cluster of objects on the first shelf in the first image;
wherein identifying the first object as the unit of the first product comprises identifying each object in the cluster of objects as a unit of the first product based on features extracted from the first region of the first image representing the cluster of objects;
further comprising:
   generating a count of units of the first product in the cluster of objects; and
   extracting an arrangement of objects in the cluster of objects from the first region of the first image; and
wherein writing the assignment for the first product to the first slot in the new planogram comprises writing the count and the arrangement to the assignment for the first slot in the new planogram.

16. A method for automatically generating a planogram assigning products to shelving structures within a store, the method comprising:
   in response to receipt of confirmation of a preferred stocking condition in the store, dispatching a robotic system to navigate along and to capture optical data of a set of shelving structures within the store during an imaging routine;

accessing a floor map of a floor space within the store generated by the robotic system from map data collected by the robotic system during the imaging routine;

receiving a set of images generated from optical data recorded by the robotic system during the imaging routine;

identifying a set of products depicted in the set of images;

identifying positions of the set of products in the store based on locations of products, in the set of products, depicted in images in the set of images and based on locations, in the floor map of the store, of the robotic system during capture of optical data associated with images in the set of images; and based on confirmation of the preferred stocking condition in the store during the imaging routine:
 generating the new planogram of the store; and
 populating the new planogram with a set of assignments defining a target stock condition of the store, each assignment in the set of assignments specifying an identifier and a position of a product, in the set of products, in the store.

17. The method of claim 16:
wherein populating the new planogram with the set of assignments defining the target stock condition of the store comprises:
 generating a first assignment specifying a first identifier of a first product and specifying a first position of a first slot in the store; and
 writing the first assignment to the new planogram; and
further comprising:
 dispatching the robotic system to execute a scan cycle succeeding the imaging cycle;
 accessing a second image comprising optical data recorded by the robotic system during the scan cycle;
 extracting a set of features from a region of the second image depicting the first slot specified in the new planogram;
 identifying improper stocking of the first product in the first slot based on differences between features in the set of features and features in a set of template images of the first product; and
 in response to identifying improper stocking of the first product in the first slot, generating a first restocking prompt for the first slot.

18. The method of claim 16:
wherein receiving the set of images from the robotic system comprises accessing a first image:
 comprising optical data recorded by the robotic system while occupying a first location in the store; and
 depicting a first shelving structure in the set of shelving structures;
wherein identifying a set of products depicted in the set of images and identifying positions of the set of products in the store comprises:
 detecting a first shelf at a first vertical position in the first image;
 detecting a first object in a first lateral position over the first shelf in the first image; and
 identifying the first object as a unit of a first product based on features extracted from a first region of the first image representing the first object; and
wherein generating the new planogram and populating the new planogram with the set of assignments comprises:
 projecting the first vertical position of the first shelf and the first lateral position of the first object onto a representation of the first shelving structure in the new planogram to define a first slot; and
 writing an assignment for the first product to the first slot in the new planogram in response to identifying the first object as the unit of the first product.

19. The method of claim 18, wherein identifying the first object as the unit of the first product comprises:
 extracting a first textual string from the first region of the first image;
 identifying a first brand associated with the first object based on the first textual string;
 retrieving a first set of template images from a database of template images, each template image in the first set of template images representing a product associated with the first brand;
 comparing the first set of features extracted from the first region of the first image to template images in the set of template images; and
 identifying the first object as the unit of the first product in response to a similarity score between features in the first set of features and features in the first template image, in the first set of template images, exceeding a threshold score.

20. The method of claim 16, wherein dispatching the robotic system to navigate through the floor space within the store comprises dispatching the robotic system to execute the imaging routine within the store following initial delivery of the robotic system to the store and in response to absence of a preexisting planogram of the store.

* * * * *